United States Patent
Smith

(10) Patent No.: US 11,669,512 B1
(45) Date of Patent: Jun. 6, 2023

(54) METHODS, DEVICES, AND SYSTEMS FOR DETERMINING, LOGGING, AND ANALYZING INTELLIGENCE, SURVEILLANCE, AND RECONNAISSANCE (ISR) INFORMATION IN NEAR REAL-TIME

(71) Applicant: Geo Owl, LLC, Wilmington, NC (US)

(72) Inventor: Nicholas Smith, Wilmington, NC (US)

(73) Assignee: Geo Owl, LLC, Wilmington, NC (US)

( * ) Notice: Subject to any disclaimer, the term of this patent is extended or adjusted under 35 U.S.C. 154(b) by 0 days.

(21) Appl. No.: 17/407,799

(22) Filed: Aug. 20, 2021

Related U.S. Application Data

(60) Provisional application No. 63/068,111, filed on Aug. 20, 2020.

(51) Int. Cl.
| | |
|---|---|
| *G06F 16/56* | (2019.01) |
| *G06F 16/23* | (2019.01) |
| *G06F 3/0482* | (2013.01) |
| *G06F 3/0484* | (2022.01) |
| *G06Q 50/26* | (2012.01) |
| *H04W 4/021* | (2018.01) |
| *G06F 16/29* | (2019.01) |
| *G06F 40/186* | (2020.01) |

(52) U.S. Cl.
CPC ........ *G06F 16/2365* (2019.01); *G06F 3/0482* (2013.01); *G06F 3/0484* (2013.01); *G06F 16/29* (2019.01); *G06F 16/56* (2019.01); *G06F 40/186* (2020.01); *G06Q 50/26* (2013.01); *H04W 4/021* (2013.01)

(58) Field of Classification Search
CPC .... H04W 4/021; G06F 16/2365; G06F 16/29; G06F 16/56; G06F 40/186; G06Q 50/26
See application file for complete search history.

(56) References Cited

U.S. PATENT DOCUMENTS

| | | | | |
|---|---|---|---|---|
| 4,232,313 | A * | 11/1980 | Fleishman | G01S 13/93 342/36 |
| 9,104,695 | B1 | 8/2015 | Cervelli et al. | |
| 11,035,690 | B2 | 6/2021 | Cervelli et al. | |
| 2011/0231796 | A1* | 9/2011 | Vigil | G06F 3/04883 715/810 |
| 2014/0064554 | A1* | 3/2014 | Coulter | G06V 20/13 382/294 |

(Continued)

*Primary Examiner* — Andrea C Leggett
(74) *Attorney, Agent, or Firm* — NK Patent Law

(57) ABSTRACT

Disclosed herein are methods, systems, and devices for facilitating in determining, logging, and analyzing intelligence, surveillance, and reconnaissance (ISR) information in near real-time. According to one embodiment, a method is implemented on a server for facilitating identification tagging and logging of ISR information. The method includes receiving georeferenced map data and receiving image data. The method further includes transmitting the georeferenced map data and image data to a client device. The method also includes receiving ISR data from the client device and storing the ISR data. In another embodiment, a method implemented on a client device for facilitating an analyst in determining and logging ISR information is disclosed. The method includes receiving georeferenced map data, displaying the georeferenced map data on a GUI implemented on the client device, receiving analyst provided input from the GUI, and transmitting ISR data to a server.

18 Claims, 27 Drawing Sheets

(56) References Cited

U.S. PATENT DOCUMENTS

| | | | | |
|---|---|---|---|---|
| 2014/0245210 | A1* | 8/2014 | Battcher | G01S 13/95 715/771 |
| 2018/0011627 | A1* | 1/2018 | Siracusano, Jr. | G06F 3/04845 |
| 2019/0227572 | A1* | 7/2019 | Blonder | G08G 5/0086 |
| 2022/0404949 | A1* | 12/2022 | Berquam | G06F 3/04845 |

* cited by examiner

FIG. 22

METHODS, DEVICES, AND SYSTEMS FOR DETERMINING, LOGGING, AND ANALYZING INTELLIGENCE, SURVEILLANCE, AND RECONNAISSANCE (ISR) INFORMATION IN NEAR REAL-TIME

PRIORITY CLAIM

This application claims priority to U.S. Provisional Patent Application Ser. No. 63/068,111 filed Aug. 20, 2020, the disclosure of which is incorporated herein by reference in its entirety.

TECHNICAL FIELD

The present invention relates to a server application, a web application, and a client/server infrastructure; and more specifically to methods, devices, and systems for facilitating one or more users in determining, logging, and analyzing intelligence, surveillance, and reconnaissance (ISR) information in near real-time.

BACKGROUND

Intelligence, surveillance, and reconnaissance (ISR) is the acquisition of information for providing intelligence to facilitate one to more commanders operating under mission command. The acquisition of the ISR information must be relevant, accurate, coherent, and timely to be as effective as possible in supporting. Additionally this acquisition must be coordinated and integrated with military personal and military computing systems. Users (military personal including monitors and analyzers) of ISR information are highly trained and professional. As large volumes of ISR information are presented to these users, human error may severely affect accuracy of the relayed information.

Accordingly, a need exists to better facilitate users in determining, logging, and analyzing intelligence, surveillance, and reconnaissance (ISR) information in near real-time.

SUMMARY

The presently disclosed subject matter is directed toward methods, devices, and systems for solving the problem of facilitating one or more users in determining, logging, and analyzing intelligence, surveillance, and reconnaissance (ISR) information in near real-time.

According to one embodiment, a method is implemented on a server for facilitating identification tagging and logging of ISR information. The method includes receiving georeferenced map data and receiving image data. The method further includes transmitting the georeferenced map data and image data to a client device. The method also includes receiving ISR data from the client device and storing the ISR data.

In some embodiments, the method may further include transmitting the ISR data to an operations center.

In some embodiments, the operations center may be a tactical operations center.

In some embodiments, the tactical operations center may be a law enforcement operations center, a military operations center, or the like.

In some embodiments, the image data may be received from a remotely piloted aircraft (RPA). In other embodiments, the image data may be received from a piloted aircraft.

In some embodiments, the image data may be received from a satellite based imaging system.

In some embodiments, the image data may be received from a light detection and ranging (LIDAR) imaging system.

In some embodiments, the image data may include full motion video (FMV) data.

In some embodiments, the image data may be associated with a military operations area.

In some embodiments, the georeferenced map data may be associated with the military operations area.

In some embodiments, the ISR data may include map call-out data.

In some embodiments, at least a portion of the map call-out data may be entered from a graphical user interface (GUI) on the client device.

In some embodiments, the GUI may be provided by an application specific program installed on the client device. In other embodiments, the GUI may be provided by a web browser installed on the client device. For example, the web browser may be a Microsoft Internet Explorer® browser, a Microsoft Edge® browser, an Apple Safari® browser, a Google Chrome® browser, a Mozilla Firefox® browser, an Opera® browser, or the like.

In some embodiments, the map call-out data may include georeferenced data.

In some embodiments, the georeferenced data may be associated with a geometrical shape.

In some embodiments, the geometrical shape may be entered from the GUI on the client device.

In some embodiments, the geometrical shape may be an oval. In certain embodiments the oval may be a circle. In other embodiments, the geometrical shape may be a polygon. In certain embodiments, the polygon may be a triangle, a quadrangle, a pentagon, a hexagon, or the like.

In some embodiments, the GUI may provide a circular menu having a plurality of templates supporting data entry. The plurality of templates may include a plurality of geometric shape templates. The plurality of templates may also include at least one vehicle template and at least one person of interest template.

In some embodiments, the geometrical shape may be represented in the map call-out data as a series of geographic coordinates.

In some embodiments, the map call-out data may further include slant count formatted data and the GUI may be configured to display the slant count formatted data.

In some embodiments, the slant count formatted data may include at least one numerical indication of one or more persons of interest.

In some embodiments, the slant count formatted data may include at least one numerical indication of one or more vehicles of interest.

In some embodiments, the georeferenced map data may be provided by one or more Esri servers.

In some embodiments, the georeferenced map data may be geographic information systems (GIS) data, geospatial data, or the like.

In some embodiments, the georeferenced map data may be raster data, vector data, or the like.

In some embodiments, the georeferenced map data may include a plurality of longitude and latitude coordinates.

In some embodiments, the georeferenced map data may be provided by the ArcGIS website, the Natural Earth website, the Global Map website, the United States Geological Survey (USGS) Earth Explorer website, the Google Maps website, the OpenStreetMap website, the OpenTopgraphy website, the NASA Earth Observations (NEO) website, the Sentinel Satellite Data website, the International Steering Committee for Global Mapping (ISCGM) website, or the like.

In some embodiments, the georeferenced map data may include elevation data.

In some embodiments, the client device may be a Department of Defense (DoD) compliant device.

In some embodiments, the client device may be a fixed client device. The fixed client device may be a personal computer (PC), a workstation, or the like.

In some embodiments, the client device may be a mobile client device. The mobile client device may be a laptop, a smart tablet, or the like.

In some embodiments, the at least one server may be a virtualized server.

In some embodiments, the at least one server may be a portion of a networked computing environment. The networked computing environment may be a cloud computing environment.

In some embodiments, the networked computing environment may be a Department of Defense (DoD) compliant networked computing environment. The networked computing environment may be compliant to a revision of the DoD Cloud Computing Security Requirements Guide (SRG). In certain embodiments, the networked computing environment may be a portion of the Amazon Web Services (AWS®) DoD compliant cloud computing environment, the Microsoft Azure® DoD compliant cloud computing environment, or the like.

In another embodiment, a server includes a memory and a processor is disclosed. The server is configured to perform a method of facilitating one or more users in determining and logging ISR information. The method includes receiving georeferenced map data and receiving image data. The method further includes transmitting the georeferenced map data and image data to a client device. The method also includes receiving ISR data from the client device and storing the ISR data.

In another embodiment, a non-transitory computer-readable storage medium for facilitating one or more users in determining and logging ISR information is disclosed. The non-transitory computer-readable storage medium stores instructions to be implemented on at least one computing device including at least one processor. The instructions when executed by the at least one processor cause the at least one computing device to perform a method. The method includes receiving georeferenced map data and receiving image data. The method further includes transmitting the georeferenced map data and image data to a client device. The method also includes receiving ISR data from the client device and storing the ISR data.

In another embodiment, a method is disclosed for facilitating one or more users in determining and logging ISR information. The method is implemented on at least one server and includes identifying interface requirements for a set of services to be implemented between SOA front-end components and SOA back-end components. At least one of the SOA front-end components is configured for communicating with a client device. A GUI of the client device is configured for receiving ISR data from an analyst. At least one of the SOA back-end components is configured for communicating with an operations center server. The operations center server provides image data. At least one of the SOA back-end components is configured for communicating with a map server. The map server provides georeferenced map data. The SOA front-end components are operable to be combined with the SOA back-end components to form an operable SOA solution.

In another embodiment, a server is disclosed including at least one processor and at least one memory. The server is configured for facilitating one or more users in determining and logging ISR information. The method includes identifying interface requirements for a set of services to be implemented between SOA front-end components and SOA back-end components. At least one of the SOA front-end components is configured for communicating with a client device. A GUI of the client device is configured for receiving ISR data from an analyst. At least one of the SOA back-end components is configured for communicating with an operations center server. The operations center server provides image data. At least one of the SOA back-end components is configured for communicating with a map server. The map server provides georeferenced map data. The SOA front-end components are operable to be combined with the SOA back-end components to form an operable SOA solution.

In another embodiment, a non-transitory computer-readable storage medium for facilitating one or more users in determining and logging ISR information is disclosed. The non-transitory computer-readable storage medium stores instructions to be implemented on at least one computing device including at least one processor. The instructions when executed by the at least one processor cause the at least one computing device to identify interface requirements for a set of services to be implemented between SOA front-end components and SOA back-end components. At least one of the SOA front-end components is configured for communicating with a client device. A GUI of the client device is configured for receiving ISR data from an analyst. At least one of the SOA back-end components is configured for communicating with an operations center server. The operations center server provides image data. At least one of the SOA back-end components is configured for communicating with a map server. The map server provides georeferenced map data. The SOA front-end components are operable to be combined with the SOA back-end components to form an operable SOA solution.

In another embodiment, a method implemented on a client device for facilitating an analyst in determining and logging ISR information. The method includes (1) receiving georeferenced map data, (2) displaying the georeferenced map data on a GUI implemented on the client device, (3) receiving analyst provided input from the GUI, and (4) transmitting ISR data to a server. The ISR data is based on the analyst provided input. In some embodiments, the client device may be a mobile client device. The mobile client device may be a laptop, a smart tablet, or the like. The ISR data may include map call-out data that includes georeferenced data. The georeferenced data may be associated with a geometrical shape that was entered from the GUI on the client device. The geometrical shape may be represented in the map call-out data as a series of geographic coordinates. The map call-out data may further include slant count formatted data and the GUI may be configured to display the slant count formatted data. The slant count formatted data may include at least one numerical indication of one or more persons of interest and/or may include at least one numerical indication of one or more vehicles of interest. The analyst provided input may be in response to direct visual contact by the analyst with the one or more persons of interest and/or may be the one or more vehicles of interest.

In another embodiment, a server includes a memory and a processor is disclosed. The server is configured to perform a method of facilitating an analyst in determining and logging ISR information. The method includes (1) receiving georeferenced map data, (2) displaying the georeferenced map data on a GUI implemented on the client device, (3) receiving analyst provided input from the GUI, and (4) transmitting ISR data to a server. The ISR data is based on the analyst provided input. In some embodiments, the client device may be a mobile client device. The mobile client device may be a laptop, a smart tablet, or the like. The ISR data may include map call-out data that includes georeferenced data. The georeferenced data may be associated with a geometrical shape that was entered from the GUI on the client device. The geometrical shape may be represented in the map call-out data as a series of geographic coordinates. The map call-out data may further include slant count formatted data and the GUI may be configured to display the slant count formatted data. The slant count formatted data may include at least one numerical indication of one or more persons of interest and/or may include at least one numerical indication of one or more vehicles of interest. The analyst provided input may be in response to direct visual contact by the analyst with the one or more persons of interest and/or may the one or more vehicles of interest.

In another embodiment, a non-transitory computer-readable storage medium for facilitating an analyst in determining and logging ISR information is disclosed. The non-transitory computer-readable storage medium stores instructions to be implemented on at least one computing device including at least one processor. The instructions when executed by the at least one processor cause the at least one computing device to perform a method. The method includes (1) receiving georeferenced map data, (2) displaying the georeferenced map data on a GUI implemented on the client device, (3) receiving analyst provided input from the GUI, and (4) transmitting ISR data to a server. The ISR data is based on the analyst provided input. In some embodiments, the client device may be a mobile client device. The mobile client device may be a laptop, a smart tablet, or the like. The ISR data may include map call-out data that includes georeferenced data. The georeferenced data may be associated with a geometrical shape that was entered from the GUI on the client device. The geometrical shape may be represented in the map call-out data as a series of geographic coordinates. The map call-out data may further include slant count formatted data and the GUI may be configured to display the slant count formatted data. The slant count formatted data may include at least one numerical indication of one or more persons of interest and/or may include at least one numerical indication of one or more vehicles of interest. The analyst provided input may be in response to direct visual contact by the analyst with the one or more persons of interest and/or may the one or more vehicles of interest.

BRIEF DESCRIPTION OF THE DRAWINGS

The present embodiments are illustrated by way of example and are not intended to be limited by the figures of the accompanying drawings. In the drawings:

FIG. 22 depicts a GUI illustrating a plurality of icons for people of interest associated with recent scenarios in accordance with embodiments of the present disclosure.

DETAILED DESCRIPTION

Figure 1:
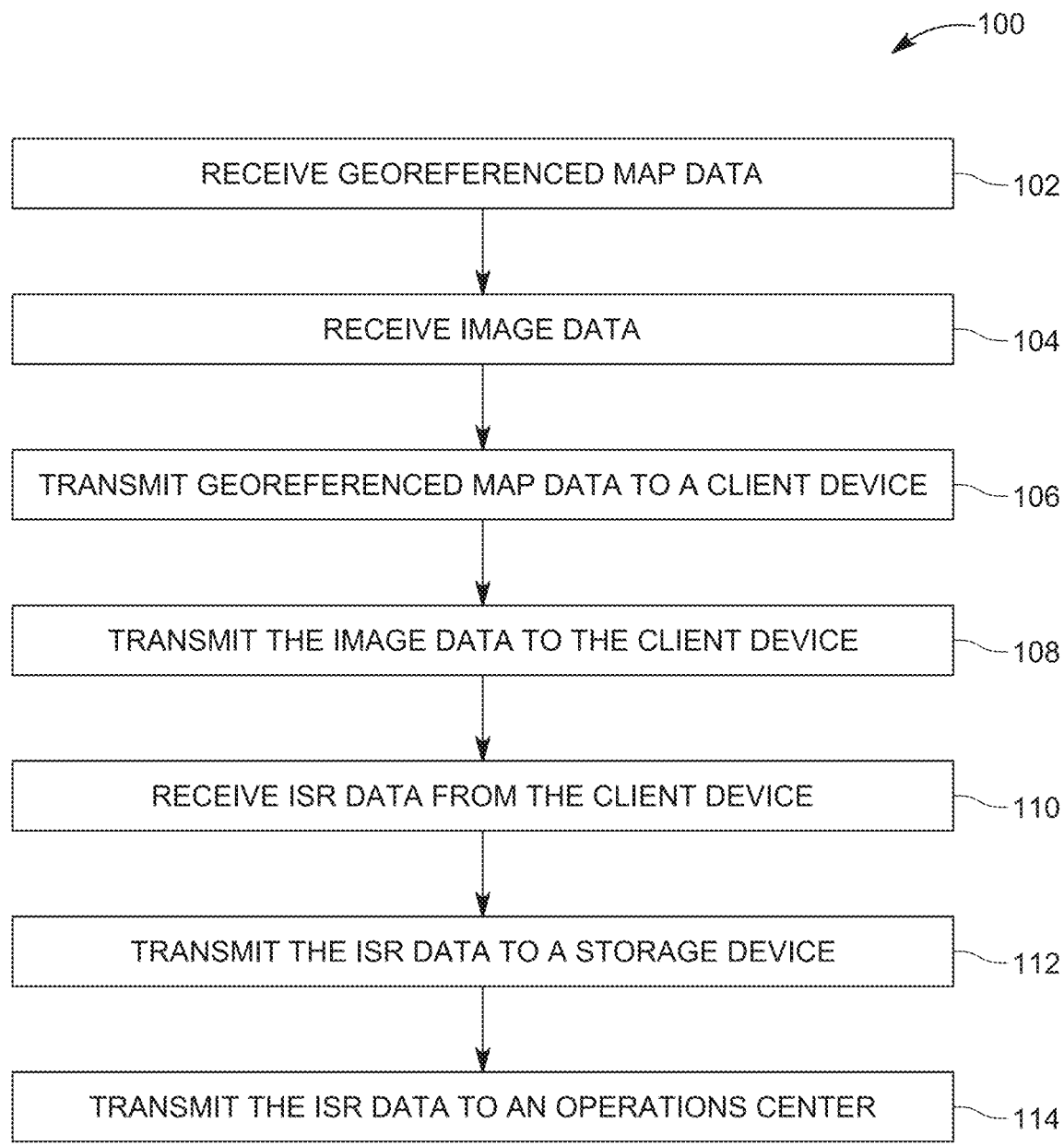
FIG. 1 depicts a flow chart illustrating a method implemented on the Geo Owl server in accordance with embodiments of the present disclosure.

The following description and drawings are illustrative and are not to be construed as limiting. Numerous specific details are described to provide a thorough understanding of the disclosure. However, in certain instances, well-known or conventional details are not described in order to avoid obscuring the description.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Disclosed herein are Geo Owl methods, devices, and systems for solving the problem of facilitating one or more users in determining, logging, and analyzing intelligence, surveillance, and reconnaissance (ISR) information in near real-time.

In one embodiment, the Geo Owl system is a client/server architecture wherein a plurality of users (e.g. ISR analysts) may communicate using their client device with one of more physical servers. The Geo Owl client device may be a fixed client device such as a workstation and/or personal computer. In other embodiments the client device may be a mobile client device such as a tablet or a laptop. The Geo Owl server may be implemented as one or more servers including physical servers, virtual servers, servers housed in containers, or the like.

FIG. 1 depicts a flow chart 100 illustrating a method implemented on the Geo Owl server in accordance with embodiments of the present disclosure. In step 102, the method includes receiving georeferenced map data. The georeferenced map data may be received, directly or indirectly, from one or more Esri map servers. The georeferenced map data may be geographic information systems (GIS) data, geospatial data, or the like. The georeferenced map data may also be raster data, vector data, or the like. The georeferenced map data may longitude and latitude coordinates. The georeferenced map data may also include elevation data. The georeferenced map data may also be received in one or more encrypted formats from the one or more map servers. In certain embodiments, the georeferenced map data may be received from an intermediary server. The intermediary server may provide the encrypted formats and negotiate a secure channel with the Geo Owl server.

The georeferenced map data may also be received, directly or indirectly, from the ArcGIS website, the Natural Earth website, the Global Map website, the United States Geological Survey (USGS) Earth Explorer website, the Google Maps website, the OpenStreetMap website, the OpenTopgraphy website, the NASA Earth Observations (NEO) website, the Sentinel Satellite Data website, the International Steering Committee for Global Mapping (ISCGM) website, or the like.

In step 104, the Geo Owl server receives image data. The image data may also be encrypted and received from an intermediary server over a secure channel. The image data and the georeferenced map data may also be received over the same secure channel and the same intermediary server. The image data may be sourced from a piloted aircraft or a remotely piloted aircraft (RPA). The image data may also be sourced from a satellite based imaging system. The image data may include full motion video (FMV) data and may be provided in near real-time from the source. The image data may be in a high definition (1080p) format, an ultra-high definition (2160p) format, or a greater resolution format. The image data may also be in a compressed format or an uncompressed format.

The image data may be sourced from a wide-area motion imaging (WAMI) system employing multiple camera sources. The image data may also be sourced from a light detection and ranging (LIDAR) imaging system. The LIDAR imaging system may be associated with a satellite imaging system or an aircraft imaging system.

Next in steps 106 and 108, Geo Owl server transmits the georeferenced map data and the image data to a client device (e.g. workstation) to be monitored and processed by an analyst. Steps 104 and 108 may continue to repeat as the image data may be FMV data. Steps 102 and 104 may repeat as the analyst may adjust location and or screen size depicting the georeferenced map data.

The analyst may have an top secret clearance (TS/SCI) and be responsible for analysis of multi-source intelligence data (including the image data) and be responsible for processing and correlating this information. The analyst may monitor the FMV data to identify persons of interest and/or vehicles of interest via a graphical user interface (GUI) associated with the client device. The analyst may then tag the persons of interest and/or the vehicles of interest against the georeferenced map data to create ISR data via the GUI. The ISR data may include map call-out data. The map call-out data may georeferenced data based on the analyst tagging persons-of-interest and/or the vehicles-of-interest. The georeferenced data may be longitude and latitude coordinates. Additionally the georeferenced data may also include elevation data. The georeferenced data may represent at least a portion of a geometrical shape. The geometrical shape may be an oval or a polygon entered by the analyst. In certain embodiments the geometrical shape may be a circle, a triangle, a rectangle, or the like. The map call-out data may further include slant count formatted data entered. The slant count formatted data may be directly entered by the analyst. In other embodiments the slant count formatted data may be partially or fully generated by the client device and/or Geo Owl server. The slant count formatted data may include at least one numerical indication of one or more persons of interest and/or at least one numerical indication of one or more vehicles of interest. In certain embodiments, the analyst may be in direct visual contact with the persons of interest and/or the vehicles of interest. For example the analyst may be in the field with a laptop or tablet using visual cues and then tagging the persons of interest and/or the vehicles of interest against the georeferenced map data to create ISR data via the GUI.

In step 110, the Geo Owl server received the ISR data from the client device. The ISR data may be received in near real-time as generated by the analyst. In step 112, the Geo Owl server stores the ISR data in one or more local data bases and/or one or more remote databases as it is received. In step 114, the Geo Owl server transmits the data to one or more operations center.

The Geo Owl server may be a physical server or a virtual server. In other embodiments the Geo Owl server may be located on a company premise, or located in any other type of datacenter. The Geo Owl server may also be configured as a plurality of physical servers and/or virtual servers. In some embodiments, an Ubuntu® server may provide the virtual server and may be implemented as a separated operating system (OS) running on one or more physical (i.e. hardware implemented) servers. Any applicable virtual server may by be used for the Ubuntu® Server function. The Ubuntu® server or other server may be implemented within the Microsoft Azure®, Amazon Web Services (AWS®), IBM cloud computing, environment, or the like.

The client device may be a fixed device or a mobile device. For example, a fixed device may be a workstation, a personal computer (PC), a smart television (TV), or the like. The mobile device may be any computing device capable of being transported easily from a one location to another location without undue difficulty and one that is capable of functional connection with a Geo Owl server regardless of its location. For example, the mobile device may be a smart tablet, a laptop, or the like. In certain embodiments, the fixed device may be fixed within a mobile vehicle. For example, a truck, a ship, or an aircraft may be used to house the fixed client device.

In general, the client device as used with the Geo Owl system may be any computing device providing a user input, display, and connectivity to one or more servers over a personal area network (PAN), a local area network (LAN) and/or a wide area network (WAN). The PAN may include Bluetooth® or Universal Serial Bus (USB). The LAN may include any combination of wired Ethernet and/or Wi-Fi access points. The WAN may include the Internet and/or another wide area private network. The WAN may also include any combination of 2G, 3G, 4G, and 5G networks. In some embodiments the WAN may include Data Over Cable Service Interface Specification (DOCSIS) networks and/or fiber networks such as passive optical networks (PONs). Access to the one or more servers may also be provided via a virtual private network (VPN) within any of the previously described networks.

In some embodiments, the client device may communicate with the Geo Owl server over a Military Network (MILNET) configured for Unclassified traffic; a Defense Secure Network One (DSNET 1) configured for Secret traffic; a Defense Secure Network Two (DSNET 2) configured for Top Secret traffic; and/or a Defense Secure Network Three (DSNET 3) configured for Top Secret/Sensitive Compartmented Information (TS/SCI). In certain embodiments the client device may communicate with the Geo Owl server over the Secret Internet Protocol Router Network (SIPR-Net). In other embodiments, a non-military network may be used for communication.

Figure 2:
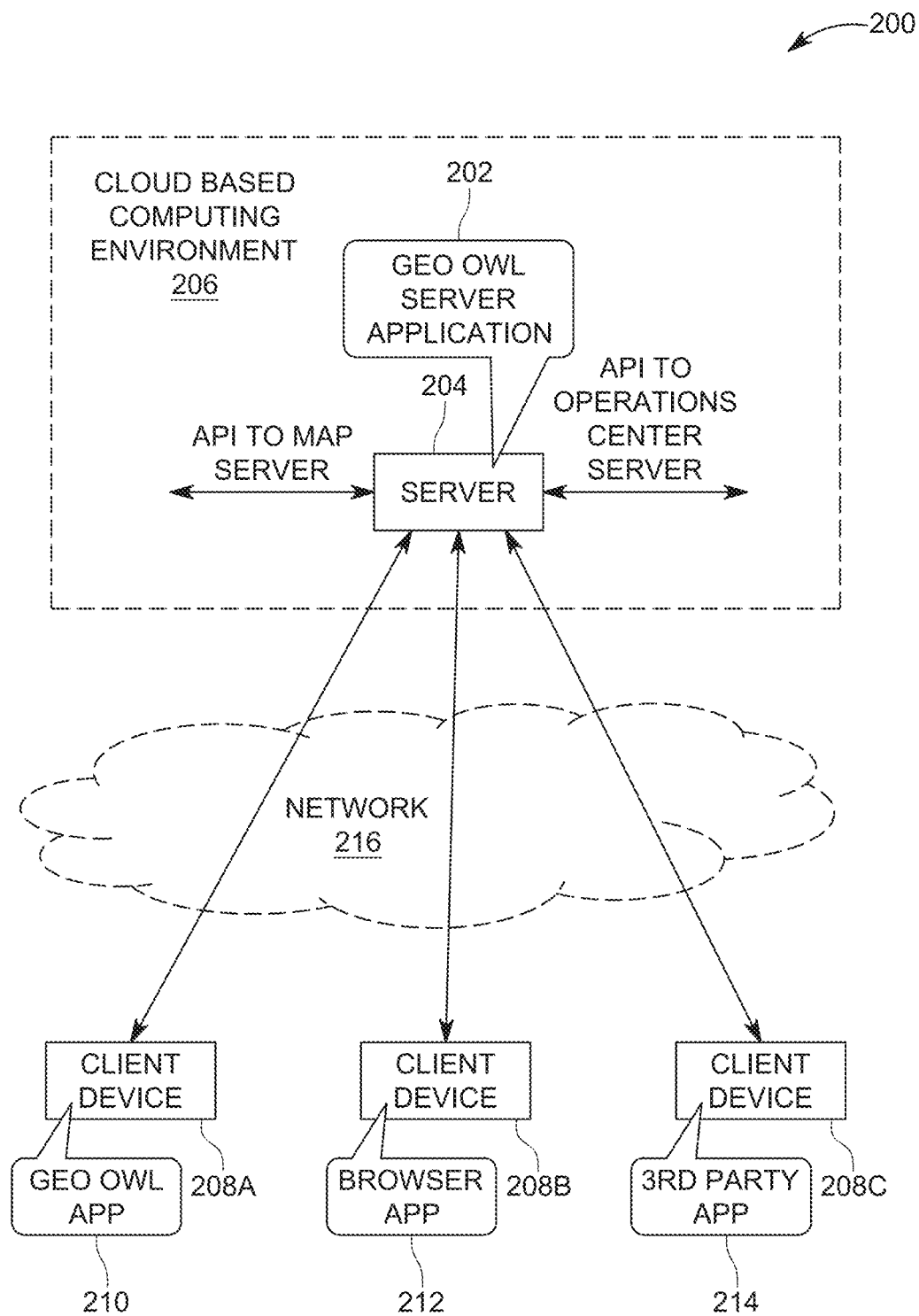
FIG. 2 depicts a system implementing the Geo Owl system as a client/server architecture in accordance with embodiments of the present disclosure.

FIG. 2 depicts a system 200 implementing the Geo Owl system as a client/server architecture in accordance with embodiments of the present disclosure. The system 200 includes a Geo Owl server application 202 hosted on a server 204. The server 204 may be resident in a cloud based computing environment 206. The cloud based computing environment 206 may be at least partially compliant with the Department of Defense (DoD) Cloud Computing Security Requirements Guide (SRG). The server 204 may communicate with a plurality of client devices 208A-C. The client devices 208A-C and their users may access the Geo Owl server application 202 using a Geo Owl app 210, a browser app 212, or a third party app 214. The client devices 208A-C may be smart tablets, laptops, workstations, PCs, smart TVs, or the likes. The client devices 208A-C may communicate with the Geo Owl server application 202 over a network 212. The network 212 may be any type or combination of wired, wireless, and/or optical networks. The network 212 may include one or more of the previously described networks.

The server 204 running the Geo Owl server application 202 may perform any of the methods described in the summary, detailed description, figures, and/or claims. The Geo Owl server application 202 may also interface to one or more map servers via an application programming interface (API). Additionally, operations servers may access the Geo Owl server application 202 by an API as disclosed previously.

The Geo Owl server application 202 transforms the server 204 from a generic computer function into a machine for solving the problem of facilitating one or more users (e.g. ISR analyst) in determining, logging, and analyzing ISR information in near real-time.

Figure 3:
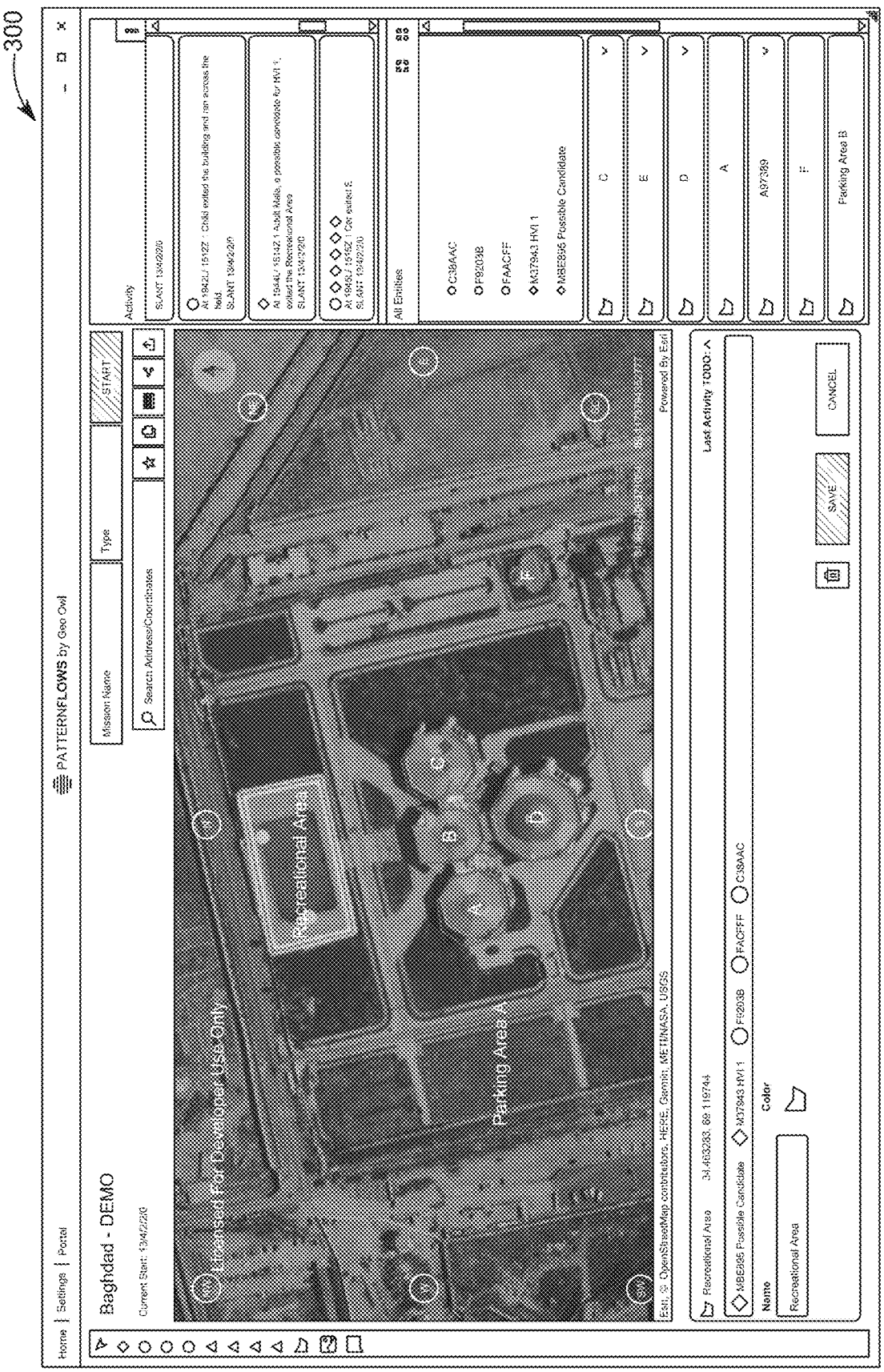
FIG. 3 depicts a GUI illustrating identified intelligence, surveillance, and reconnaissance (ISR) data provided by an analyst per the flow chart FIG. 1 in accordance with embodiments of the present disclosure.

FIG. 3 depicts a GUI 300 illustrating identified ISR data (including a plurality of geometric shapes) by an analyst such as previously described in the flow chart 100 of FIG. 1 in accordance with embodiments of the present disclosure. A rectangle (i.e. geometric shape) has been entered and tagged as a "Recreational Area" by the analyst using the received image data and the received georeferenced map data. Additional rectangles have been entered and tagged "Parking Area A" and "Parking Area B". Other polygons have entered and tagged "A" through "F". Further information on persons of interest and vehicles of interest are tagged on the right side of the GUI 300 for FIG. 3. Icons are further used to identify and select these persons of interest and vehicles of interest. At least a portion of the persons of interest and vehicles of interest may be presented in a slant format.

The GUI further depicts the geographic map data is currently being received from Esri. An analyst may define a mission name and type. Additionally, an analyst may search based on location addresses and or geographic coordinates.

Figure 4:
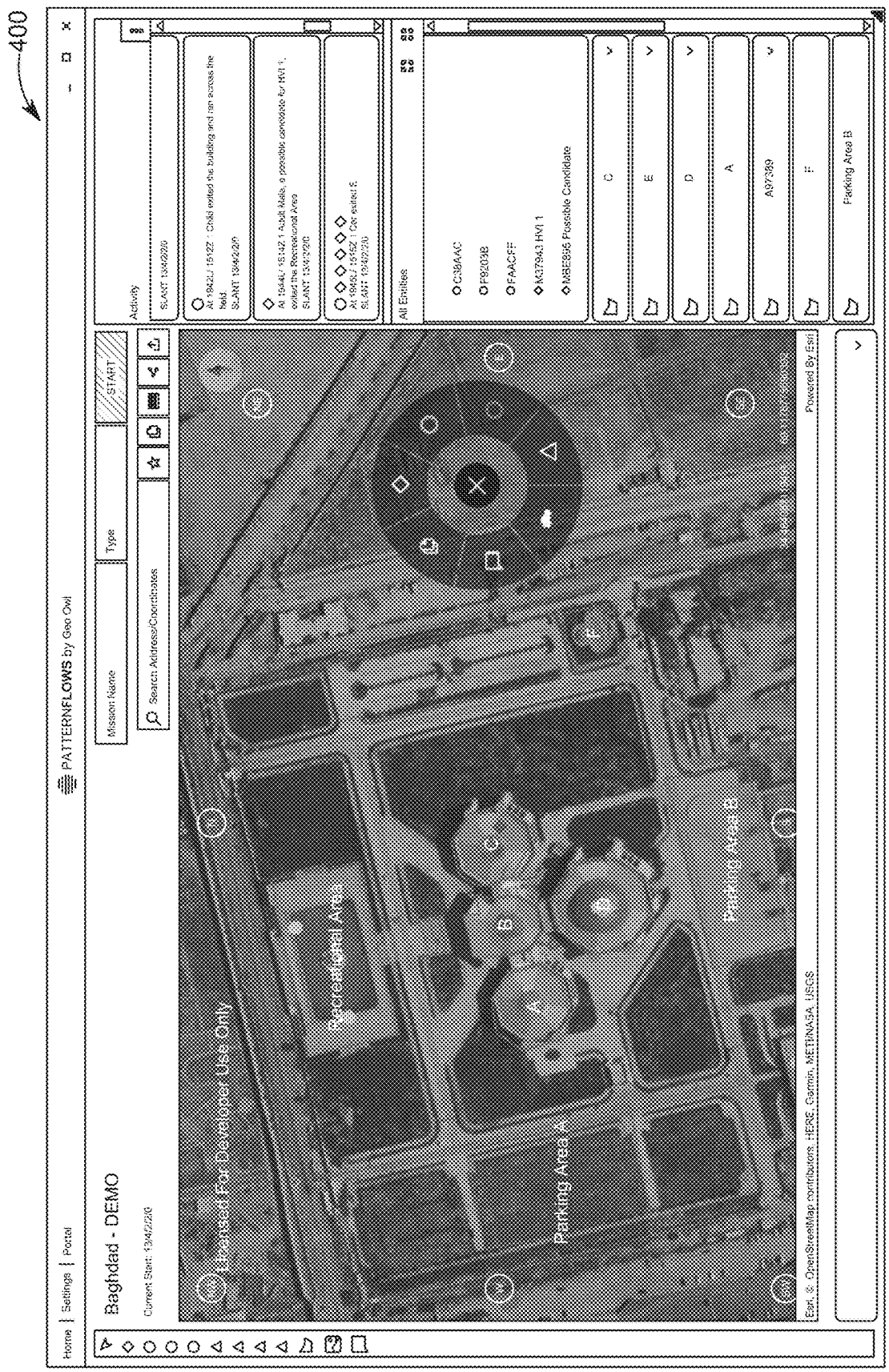
FIG. 4 depicts a GUI 400 a wheel based on map screen menu for additional selections of icons and geometric shapes for tagging in accordance with embodiments of the present disclosure.

FIG. 4 depicts a GUI 400 similar to the GUI 300 of FIG. 3 in accordance with embodiments of the present disclosure. The GUI 400 depicts an on map screen menu for additional selections of icons and geometric shape labels for tagging. An analyst may create a geometric shape as an overlay on the map area. The analyst may then insert persons of interest into the geometrical shape. The Geo Owl system then creates slant data associated the persons of interest and the geometrical shape. For example, the slant data may be formatted as [men of interest]/[women of interest]/[children of interest].

Figure 5:
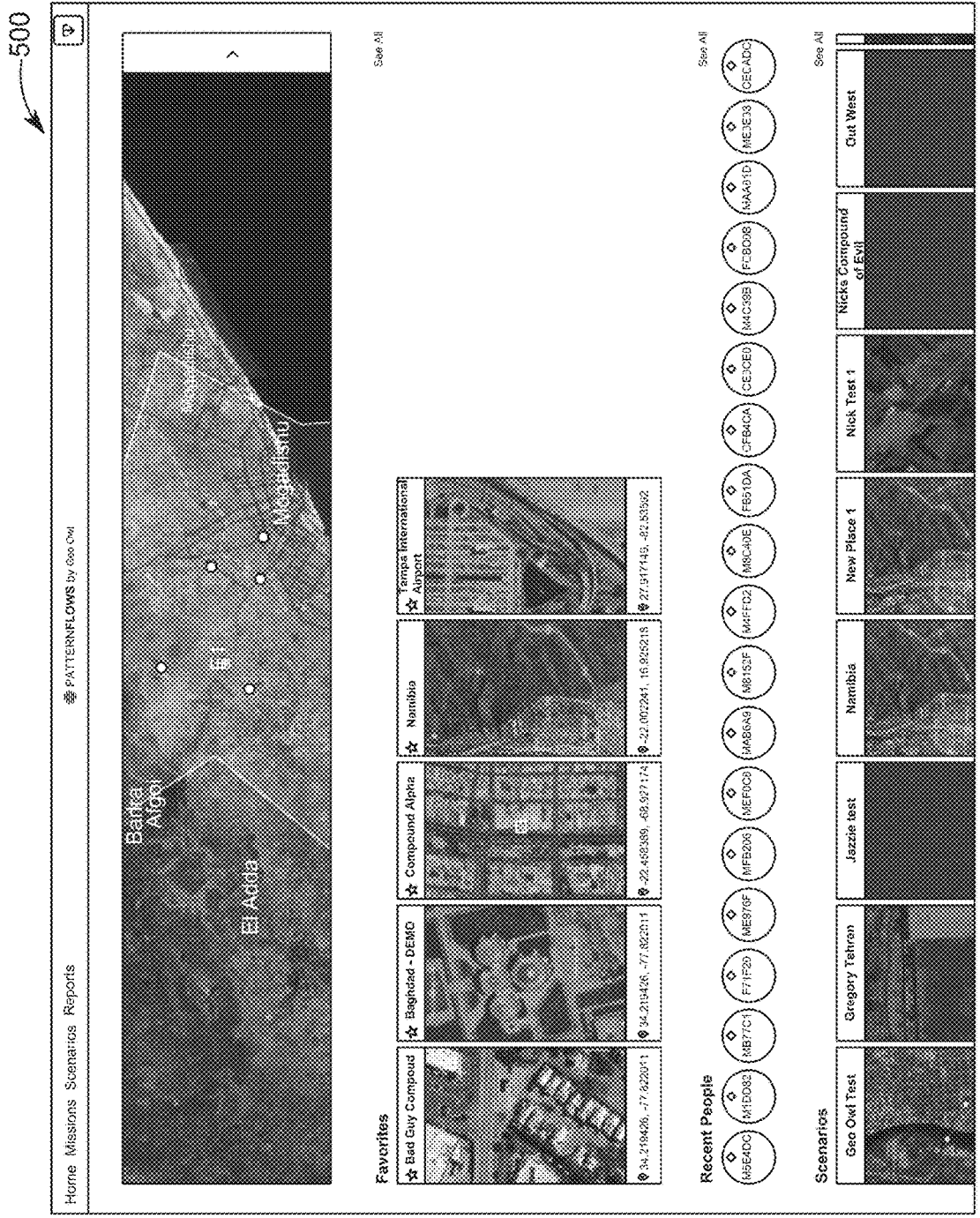
FIG. 5 depicts a GUI 500 illustrating aggregation of ISR data from multiple analysts in accordance with embodiments of the present disclosure.

FIG. 5 depicts a GUI 500 illustrating aggregation of ISR data from multiple analysts in accordance with embodiments of the present disclosure. A large map at the top of the GUI illustrates at least a portion of a military mission area. Ions (labeled as "Favorites") allow a smaller area of the large map to be selected to review ISR data associated with that area. The icons are tagged and provide geographical coordinates for the given area. Additionally people of interest and/or vehicles of interest may be selected.

Figure 6:
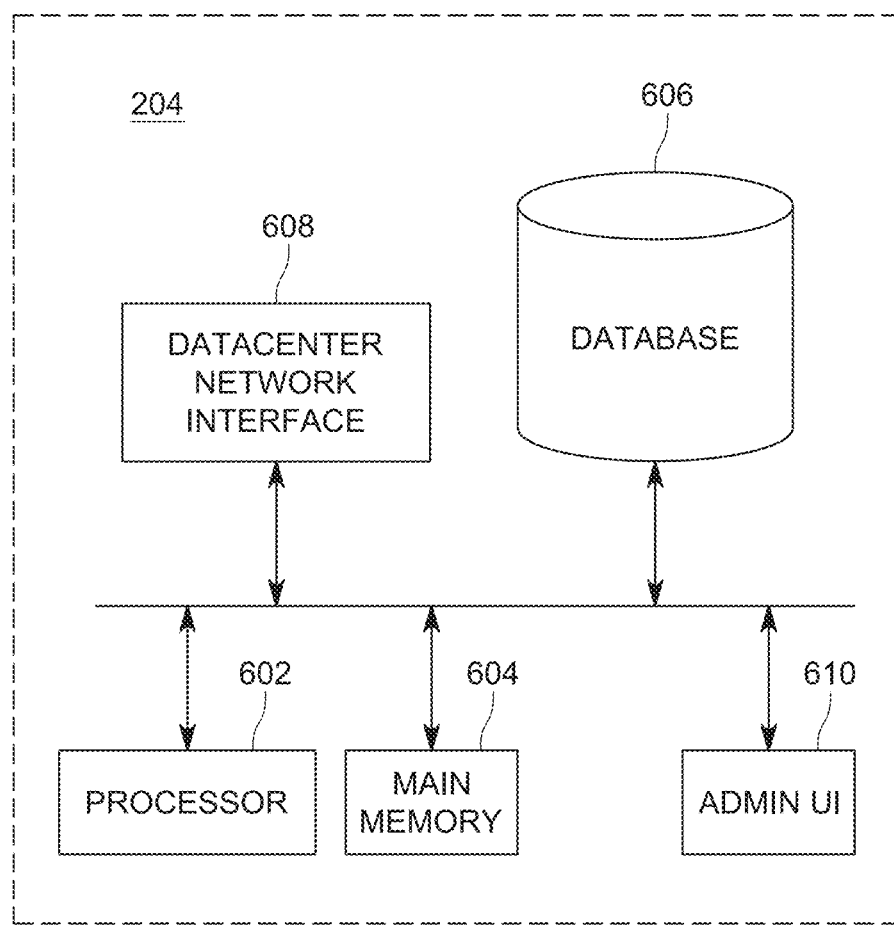
FIG. 6 depicts a block diagram illustrating an embodiment of a server of FIG. 2 in accordance with embodiments of the present disclosure.

FIG. 6 depicts a block diagram 600 illustrating an embodiment of the server 204 of FIG. 2 in accordance with embodiments of the present disclosure. The server 204 may include at least one of processor 602, a main memory 604, a database 606, a datacenter network interface 608, and an administration user interface (UI) 610. The server 204 may be configured to host the Ubuntu® server as discussed earlier. In some embodiments Ubuntu® server may be distributed over a plurality of hardware servers using hypervisor technology.

The processor 602 may be a multi-core server class processor suitable for hardware virtualization. The processor may support at least a 64-bit architecture and a single instruction multiple data (SIMD) instruction set. The main memory 604 may include a combination of volatile memory (e.g. random access memory) and non-volatile memory (e.g. flash memory). The database 606 may include one or more hard drives.

The datacenter network interface 608 may provide one or more high-speed communication ports to the data center switches, routers, and/or network storage appliances. The datacenter network interface 608 may include high-speed optical Ethernet, InfiniBand (IB), Internet Small Computer System Interface (iSCSI), and/or Fibre Channel interfaces. The administration UI may support local and/or remote configuration of the server 204 by a datacenter administrator.

Figure 7:
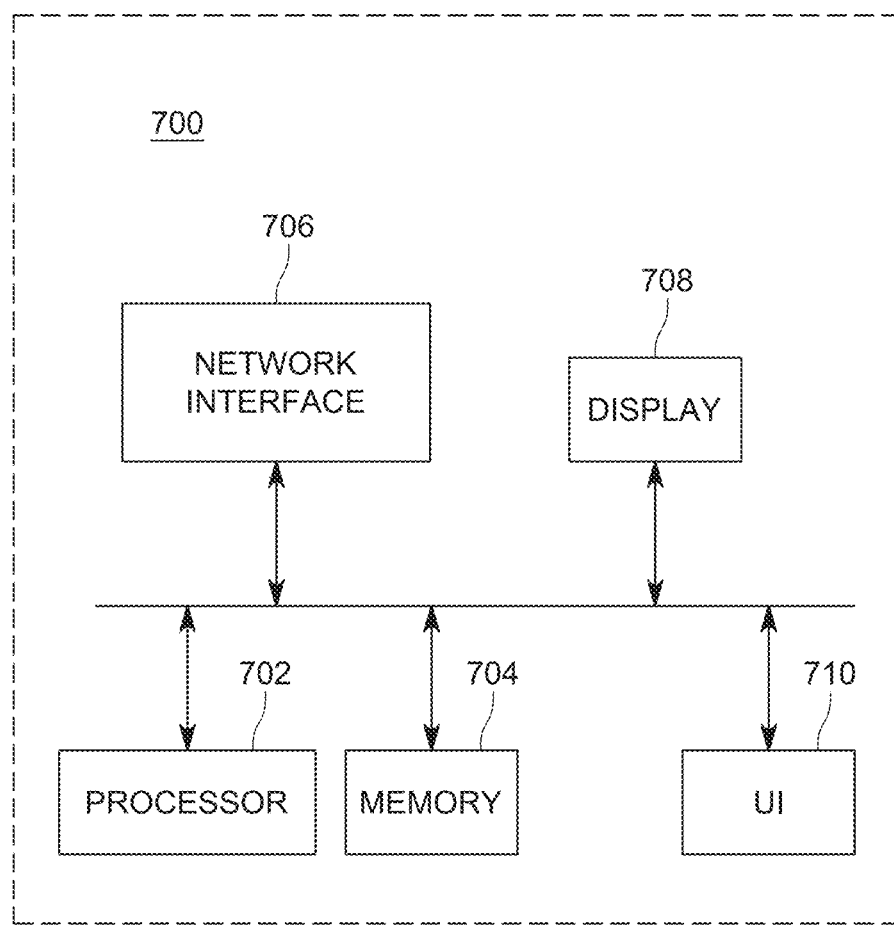
FIG. 7 depicts a block diagram illustrating an embodiment of a workstation representative of a client device of FIG. 2 in accordance with embodiments of the present disclosure.

FIG. 7 depicts a block diagram illustrating one embodiment of a workstation 700 in accordance with embodiments of the present disclosure. The workstation may be any of the client devices 208A-C of FIG. 2. The workstation may be a DoD compliant device. Specifically, the workstation may be at least partially compliant with Defense Information Systems Agency (DISA) Security Technical Implementation Guides (STIGs) and Security Requirements Guides (SRGs). The workstation 700 may include at least one processor 702, a memory 704, a network interface 706, a display 708, and a UI 710. The memory 704 may be partially integrated with the processor 702. The UI 710 may include a keyboard and a mouse. The display 708 and the UI 710 may provide any of the GUIs in the embodiments of this disclosure.

Figure 8:
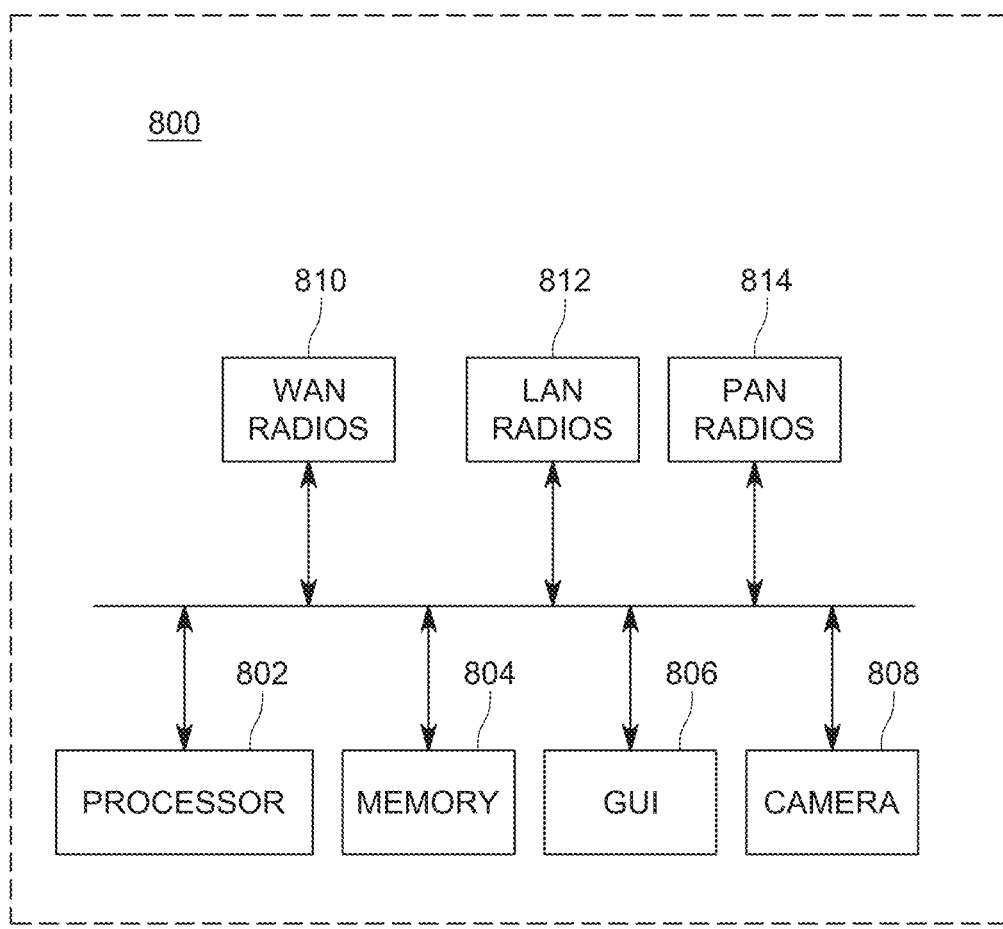
FIG. 8 depicts a block diagram illustrating an embodiment of a mobile device representative of a client device of FIG. 2 in accordance with embodiments of the present disclosure.

FIG. 8 depicts a block diagram illustrating one embodiment of a mobile device 800 in accordance with embodiments of the present disclosure. The mobile device may be a DoD compliant device. Specifically, the mobile device may be compliant with Defense Mobility Unclassified Capability (DMUC), Defense Mobility Classified Capability-Secret (DMCC-S), or DOD Mobility Classified Capability-Top Secret (DMCC-TS). The mobile device 800 may be any of the client devices 208A-C of FIG. 2. The mobile device 800 may be a smart tablet. The mobile device 800 may include at least a processor 802, a memory 804, a GUI 806, a camera 808, WAN radios 810, LAN radios 812, and PAN radios 814. In some embodiments, the mobile device 800 may be a laptop, a tablet, or the like.

In some embodiments, the processor 802 may be a mobile processor such as the Qualcomm® Snapdragon™ mobile processor. The memory 804 may include a combination of volatile memory (e.g. random access memory) and non-volatile memory (e.g. flash memory). The memory 804 may be partially integrated with the processor 802. The GUI 806 may be a touchpad display. The WAN radios 810 may include 2G, 3G, 4G, and/or 5G technologies. The LAN radios 812 may include Wi-Fi technologies such as 802.11a, 802.11b/g/n, 802.11ac, 802.11.ax or the like circuitry. The PAN radios 814 may include Bluetooth® technologies.

Figure 9:
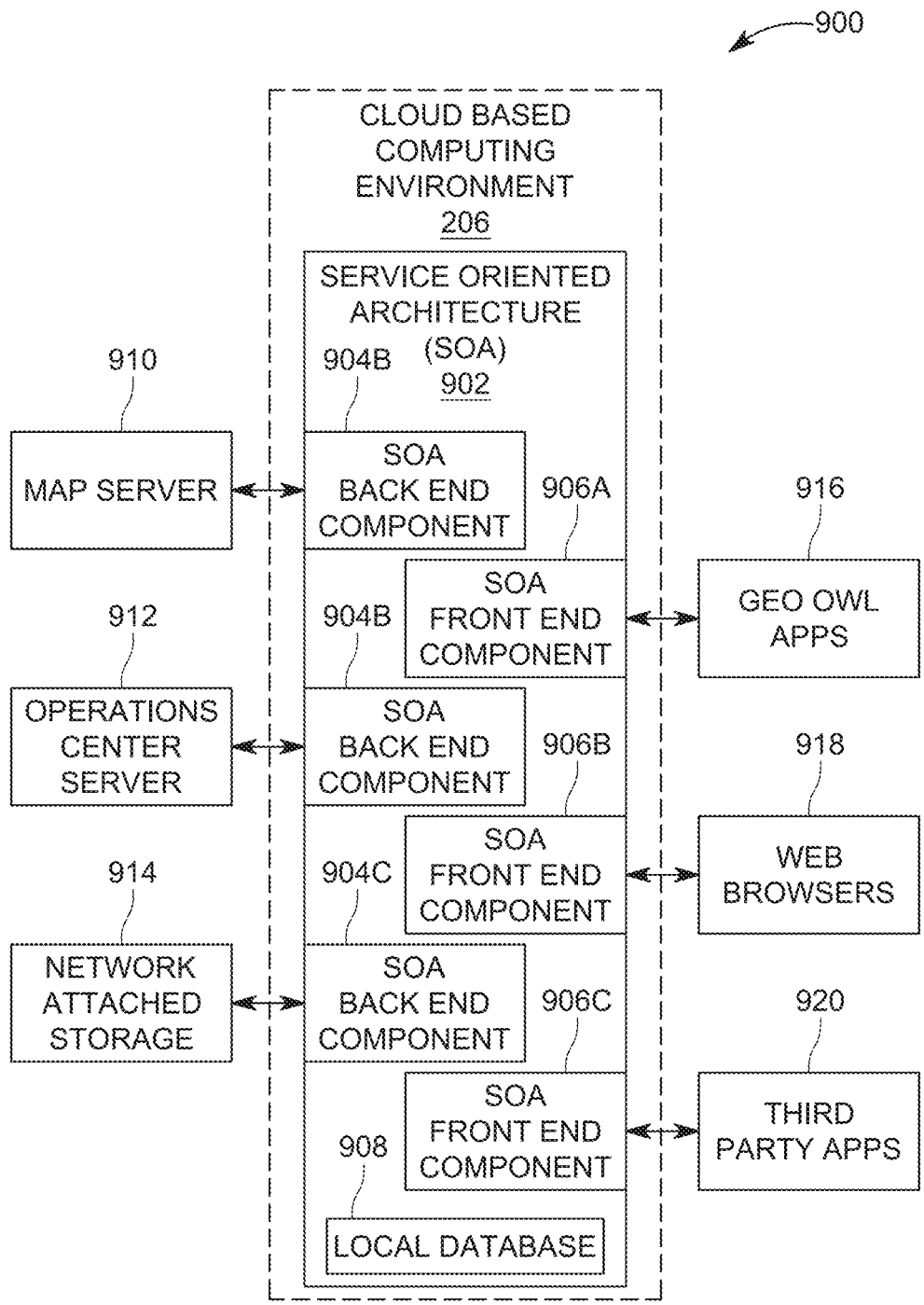
FIG. 9 depicts a system illustrating a further embodiment of the Geo Owl system including a service-oriented architecture (SOA) implemented within a cloud based computing environment in accordance with embodiments of the present disclosure.

FIG. 9 depicts a system 900 illustrating a further embodiment of the Geo Owl system in accordance with embodiments of the present disclosure. The system 900 includes a service-oriented architecture (SOA) 902 implemented within a cloud based computing environment 902. The SOA 902 provides a collection of services, wherein the services communicate with each other. The communications may range from simple exchanges of data to two or more services coordinating one or more activities. Each service may be a function that is self-contained and well-defined. Each service may not depend on a state or context of each of the other services.

The SOA 902 includes SOA back-end components 904A-C and front-end components 906A-C for facilitating one or more users in determining ISR information. The SOA also includes a database 908. In some embodiments, the database 908 may be an open source database such as the MongoDB® database, the PostgreSQL® database, or the like. An additional front-end component (not shown in FIG.

9) may be configured to provide an administrator access secure web portal. The administrator access secure web portal may be configured to provide status and control of the operable SOA solution.

The SOA back-end component 904A is configured to communicate with at least one map server 910. The SOA back-end component 904B is configured to communicate with at least one operations center server 912. The SOA back-end component 904C is configured to communicate with network attached storage 914. In some embodiments the SOA back-end components 904A-C may also use one or more transfer protocols such as a hypertext transfer protocol (HTTP) session, an HTTP secure (HTTPS) session, a secure sockets layer (SSL) protocol session, a transport layer security (TLS) protocol session, a datagram transport layer security (DTLS) protocol session, a file transfer protocol (FTP) session, a user datagram protocol (UDP), a transport control protocol (TCP), or a remote direct memory access (RDMA) transfer protocol.

The SOA front-end component 906A is configured communicate with a plurality of Geo Owl applications 916 installed on a plurality of client devices. The SOA front-end component 906B is configured to communicate with a plurality of web browsers 918 installed on a plurality of client devices. The SOA front-end component 906C is configured to communicate with a plurality of third party applications 920 installed on a plurality of client devices. The client devices may be any of the previously described client device.

The SOA 902 may be implemented on one or more servers. The SOA 902 may include a non-transitory computer readable medium including a plurality of machine-readable instructions which when executed by one or more processors of the one or more servers are adapted to cause the one or more servers to perform a method of facilitating one or more users (e.g. analysts) in determining and logging ISR information. The method includes receiving georeferenced map data and receiving image data. The method further includes transmitting the georeferenced map data and image data to a client device. The method also includes receiving ISR data from the client device and storing the ISR data. In certain embodiments the method may include the method of FIG. 1.

In one embodiment, the SOA 902 may be implemented on a virtual (i.e. software implemented) server in a cloud computing environment. An Ubuntu® server may provide the virtual server and may be implemented as a separated operating system (OS) running on one or more physical (i.e. hardware implemented) servers. Any applicable virtual server may by be used for the Ubuntu® Server function. The Ubuntu® Server function may be implemented in the Microsoft Azure®, the Amazon Web Services® (AWS), or the like cloud computing data center environments. The Ubuntu® Server function may be implemented in a secure military computing environment. In other embodiments, the SOA 902 may be implemented on one or more servers in a networked computing environment located within a business premise or another data center. In some embodiments, the SOA 902 may be implemented within a virtual container, for example the Docker® virtual container.

In summary, the SOA front-end components are operable to be combined with the SOA back-end components of FIG. 9 to form an operable SOA solution. The SOA 902 transforms the one or more servers into a machine that solves the problem of efficiently facilitating the one or more users (e.g. analysts) in determining and logging the ISR information.

Figure 10:
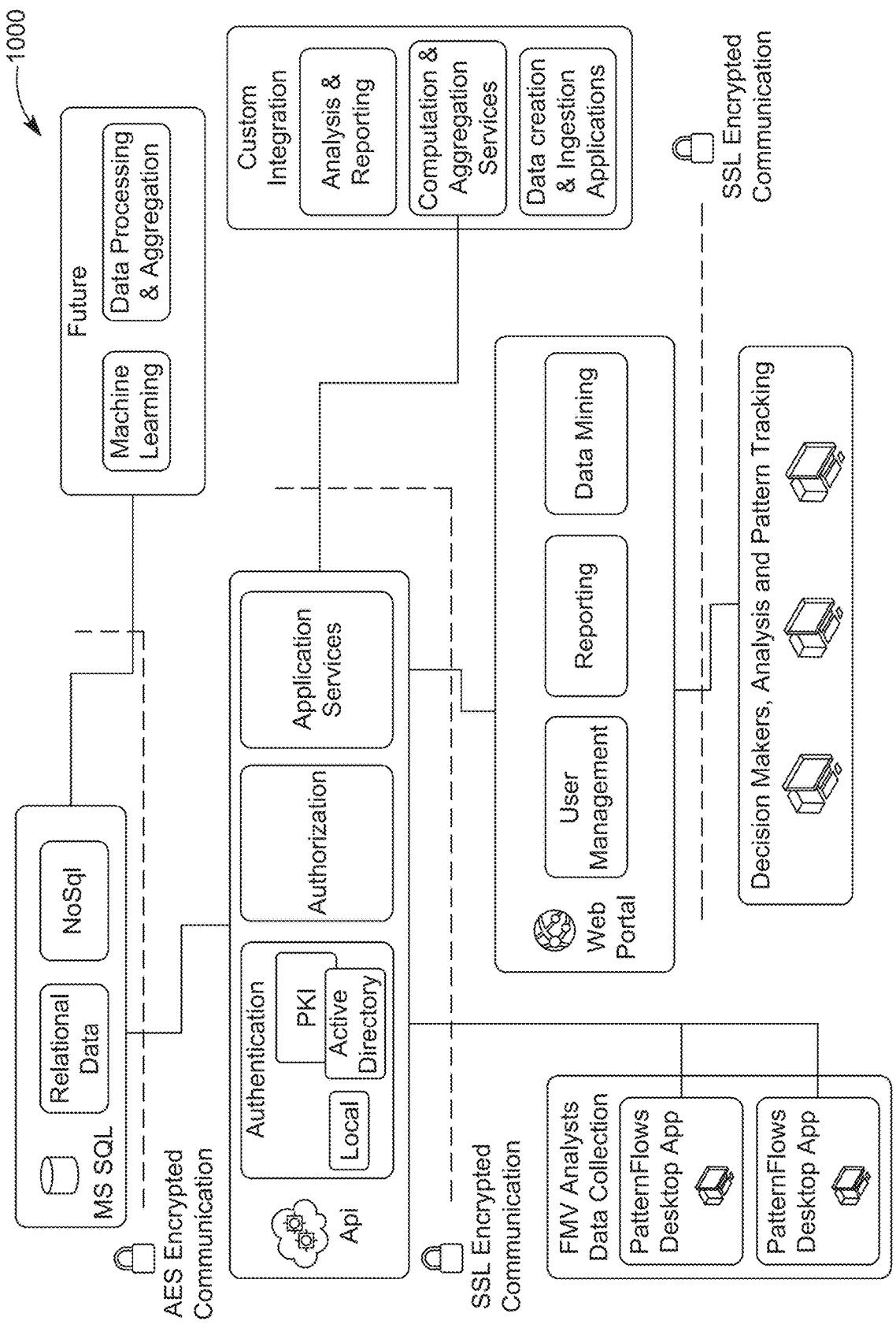
FIG. 10 depicts a block diagram illustrating another system architecture diagram of the Geo Owl system in accordance with embodiments of the present disclosure.

FIG. 10 depicts a block diagram 1000 illustrating another system architecture diagram of the Geo Owl system in accordance with embodiments of the present disclosure. The block diagram 1000 includes a Microsoft SQL Server (MS-SQL) providing a relational database management system (RDBMS). An application programing interface (API) provides authentication, authorization and application services. Desktop applications provide for data collection by full motion video (FMV) analysts. A web portal provides user management, reporting, and data mining. The web portal is configured to support state holders in decisions, analysis, and pattern tracking. The Geo Owl system also supports custom integration for analysis and reporting, computation and aggregation services, and data creation and ingestion applications. Interfaces are protected by advanced encryption standard (AES) encrypted communication and secure sockets layer encrypted communication. The architecture also supports future upgrades including machine learning, and data processing and aggregation capabilities.

Figure 11:
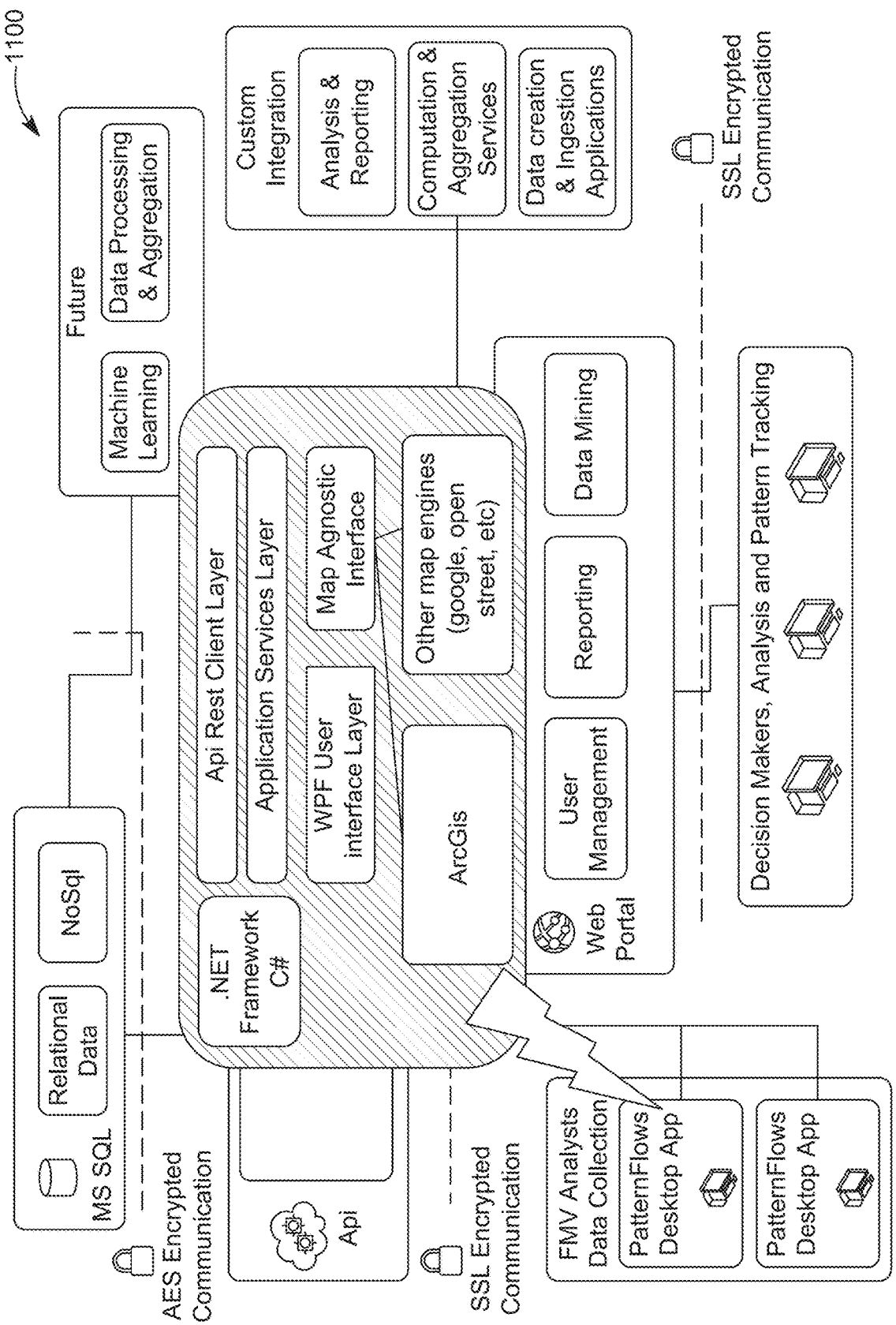
FIG. 11 depicts a block diagram illustrating additional detail of a desktop application architecture of the system architecture diagram of FIG. 10 in accordance with embodiments of the present disclosure.

FIG. 11 depicts a block diagram 1100 illustrating additional architecture detail of the desktop application of the system architecture diagram of FIG. 10 in accordance with embodiments of the present disclosure. The desktop application includes an API Representational state transfer (REST) client layer, an application services layer, a Windows presentation foundation (WPF) user interface layer, and a map agnostic interface. The map agnostic interface is configured to receive mapping data from an ArcGIS client and other map providing servers such as Google® Maps, Open Street, and/or the like. The architecture is further built on .NET framework and the object-oriented programming language C#.

Figure 12:
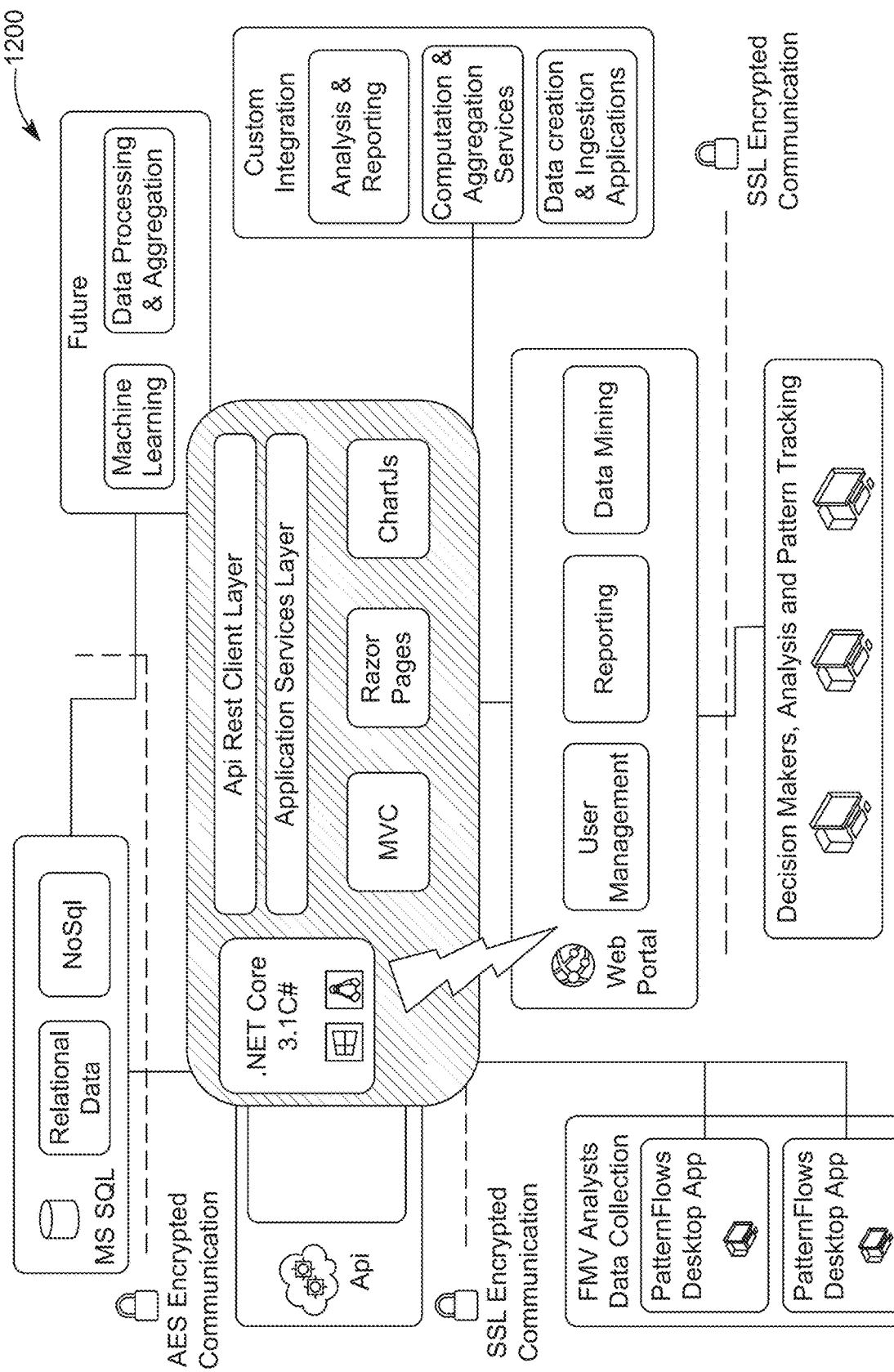
FIG. 12 depicts a block diagram illustrating additional detail of a web portal architecture of the system architecture diagram of FIG. 10 in accordance with embodiments of the present disclosure.

FIG. 12 depicts a block diagram 1200 illustrating additional architecture detail of the web portal of the system architecture diagram of FIG. 10 in accordance with embodiments of the present disclosure. The web portal includes an API REST client layer and an application services layer. The web portal also includes a model-view-controller (MVC), Razor Pages, and Chart.js. The architecture is further built on .NET Core 3.1 and C#.

Figure 13:
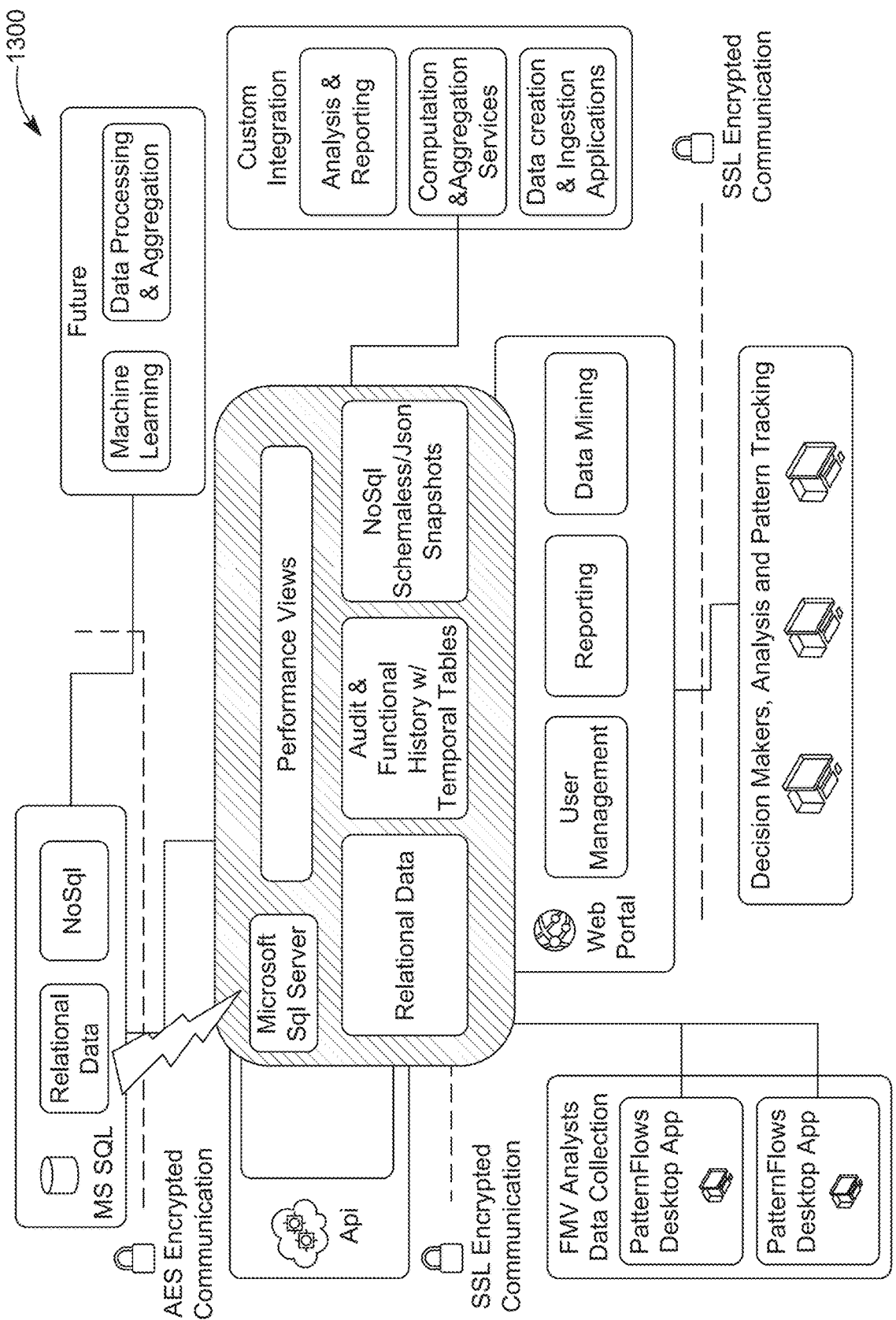
FIG. 13 depicts a block diagram illustrating additional detail of a data storage architecture of the system architecture diagram of FIG. 10 in accordance with embodiments of the present disclosure.

FIG. 13 depicts a block diagram 1300 illustrating additional architecture detail of the data storage of the system architecture diagram of FIG. 10 in accordance with embodiments of the present disclosure. The data storage includes a Microsoft SQL server providing performance views and relational data storage. The Microsoft SQL server also provides auditing and function history with temporal tables, and a NoSQL schemaless database with JSON snapshots.

Figure 14:
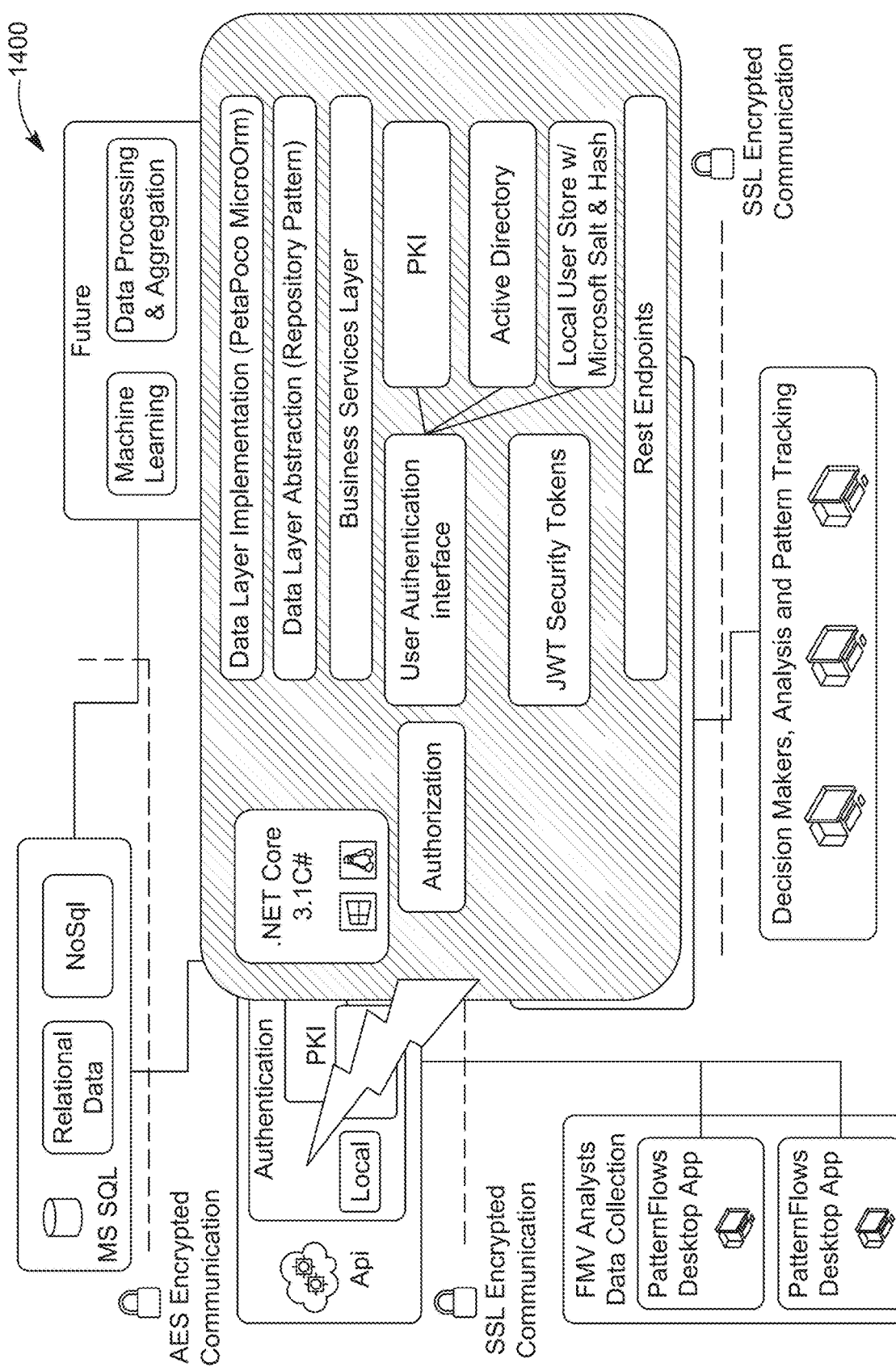
FIG. 14 depicts a block diagram illustrating additional detail of an application programing interface (API) API authentication architecture of the overall architecture of the system architecture diagram of FIG. 10 in accordance with embodiments of the present disclosure.

FIG. 14 depicts a block diagram 1400 illustrating additional detail of the API authentication architecture of the overall system architecture diagram of FIG. 10 in accordance with embodiments of the present disclosure. The authentication architecture is built on NET Core 3.1 and C# for providing authorization. The authentication architecture includes a data layer implementation based on PetaPoco micro-ORM, a data layer abstraction based on a repository pattern, and a business services layer. The authentication architecture further includes a user authentication interface based on a public key infrastructure (PKI), an active directory, and a local user store using Microsoft salting and hashing for passwords. The authentication architecture further includes REST endpoints.

Figure 15:
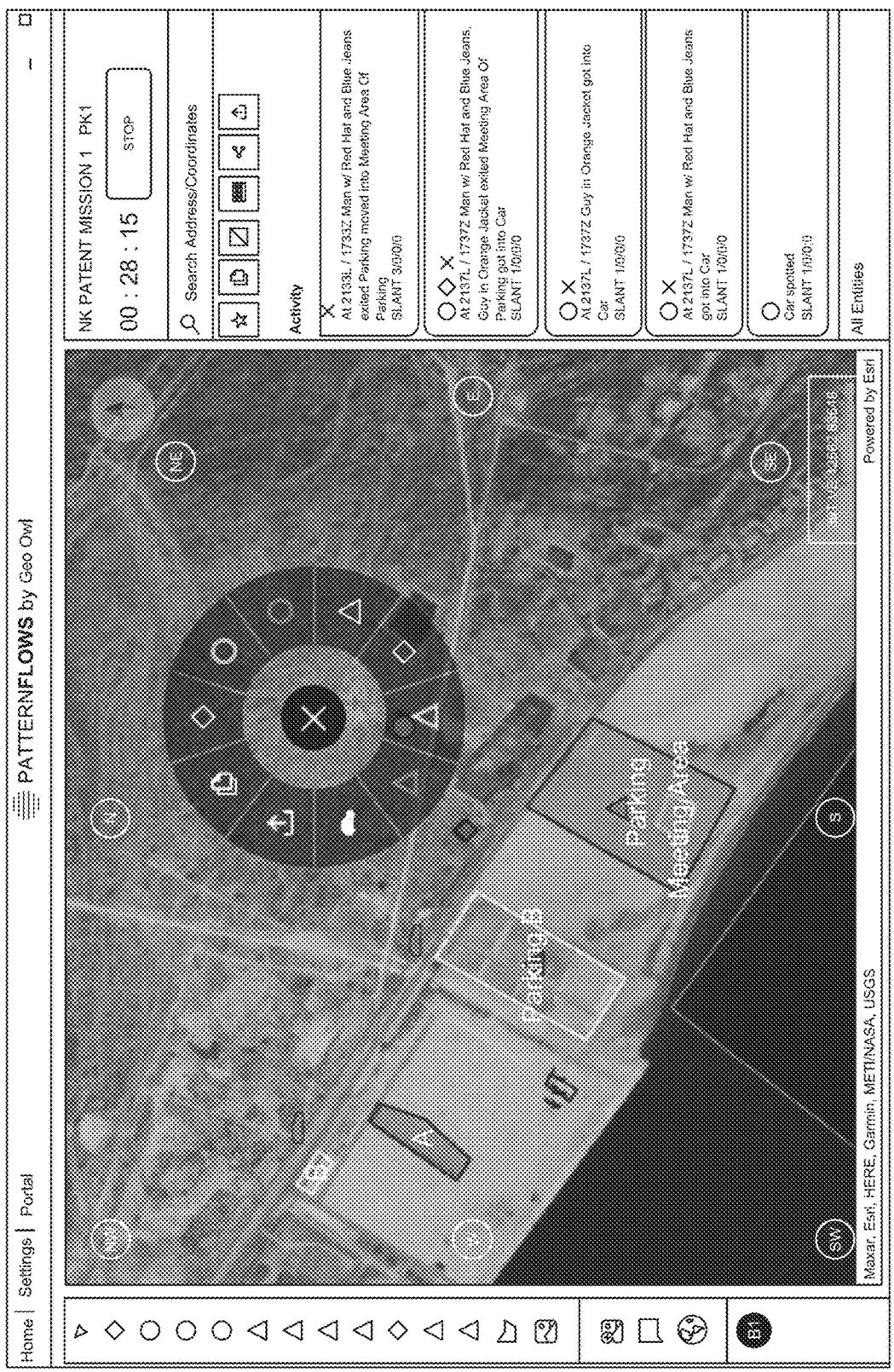
FIG. 15 depicts a GUI illustrating another wheel based on map screen menu for additional selections of icons and geometric shapes for tagging in accordance with embodiments of the present disclosure.

FIG. 15 depicts a GUI 1500 illustrating a wheel based (i.e. circular) menu for additional selections of icons and geometric shapes for tagging in accordance with embodiments of the present disclosure. The circular menu provides a simple and quick method for an analyst to identify and tag ISR data. The circular menu includes a plurality of templates including different geometric shape templates with different colors. Additionally the circular menu provides vehicle templates and a method to attach/upload additional files (e.g. documents, videos, and/or images) to a given location of interest, a person of interest, people of interest, a vehicle of interest, a mission, and/or at time. Files may also include Twitter® posts, vehicle route files, and/or the like. Tags indicating priority may also be added.

Figure 16:
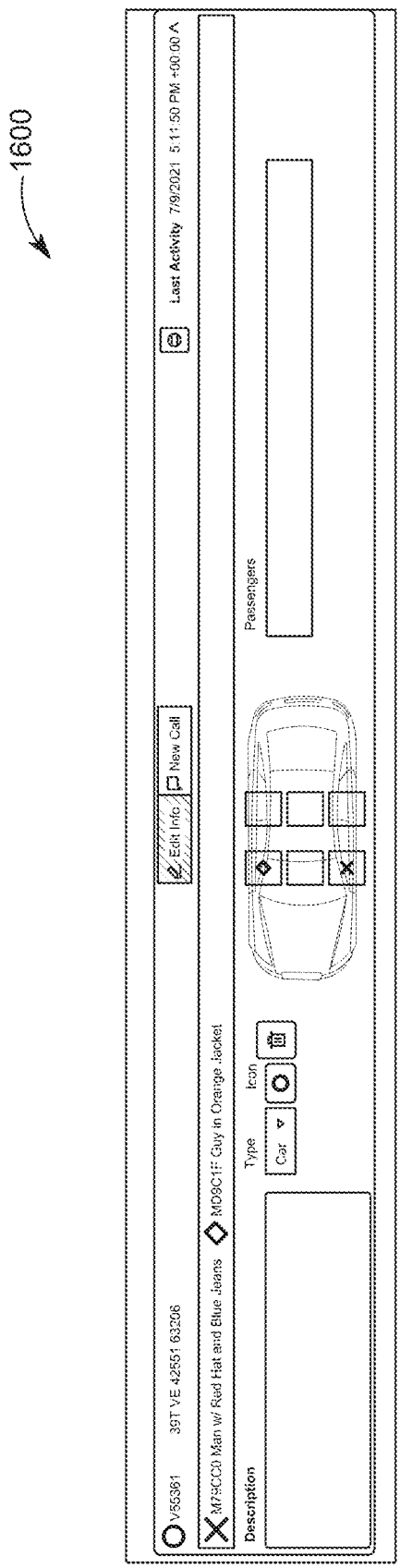
FIG. 16 depicts a GUI illustrating ISR data provided by an analyst for people of interest associated with a vehicle in accordance with embodiments of the present disclosure.

FIG. 16 depicts a GUI 1600 illustrating ISR data provided by an analyst for people of interest associated with a vehicle in accordance with embodiments of the present disclosure. The analyst may insert one or more persons of interest to locations within the vehicle. A vehicle type may be selected from a pull down menu. The GUI 1600 also provides an area for an analyst to enter a description of the vehicle and/or persons of interest. The GUI 1600 is also configured for tagging the time and location of the vehicle.

Figure 17:
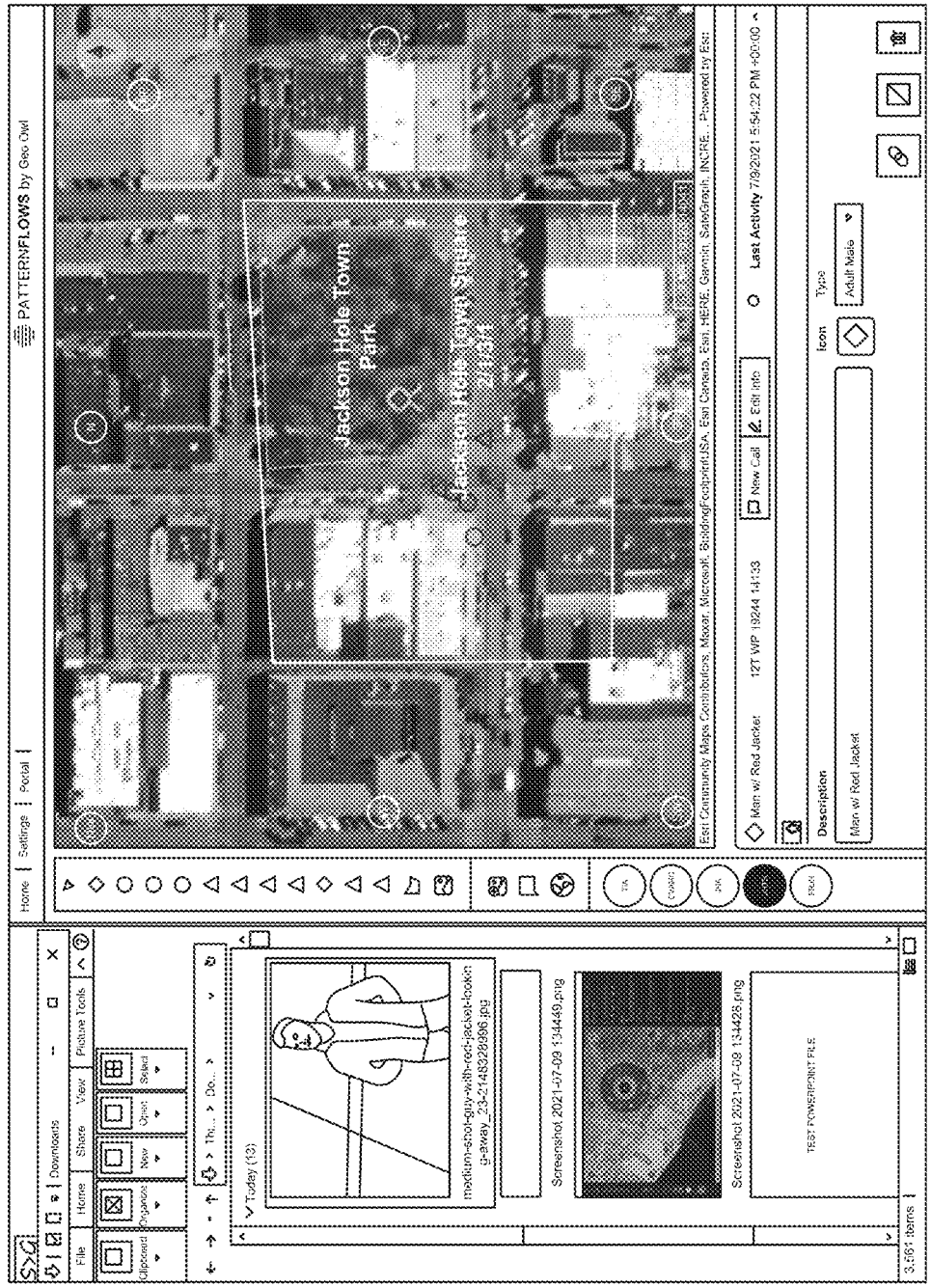
FIG. 17 depicts a GUI illustrating ISR data provided by the analyst for a person of interest associated with georeferenced map data with boundaries defined by a geometric shape in accordance with embodiments of the present disclosure.

FIG. 17 depicts a GUI 1700 illustrating ISR data provided by the analyst for a person of interest associated with georeferenced map data with boundaries defined by a geometric shape in accordance with embodiments of the present disclosure. The person of interest is tagged as "Man w/ Red Jacket" and is represented as a diamond (i.e. geometric shape) on a map. He is also tagged as an "Adult Male" with information on last activity including a timestamp and location. Additional information may be provided by the analyst. For example, "Man w/ Red Jacket departed to southeast of screen." Also, icons may be presented to view one or more live camera feeds in the area of interest.

Figure 18:
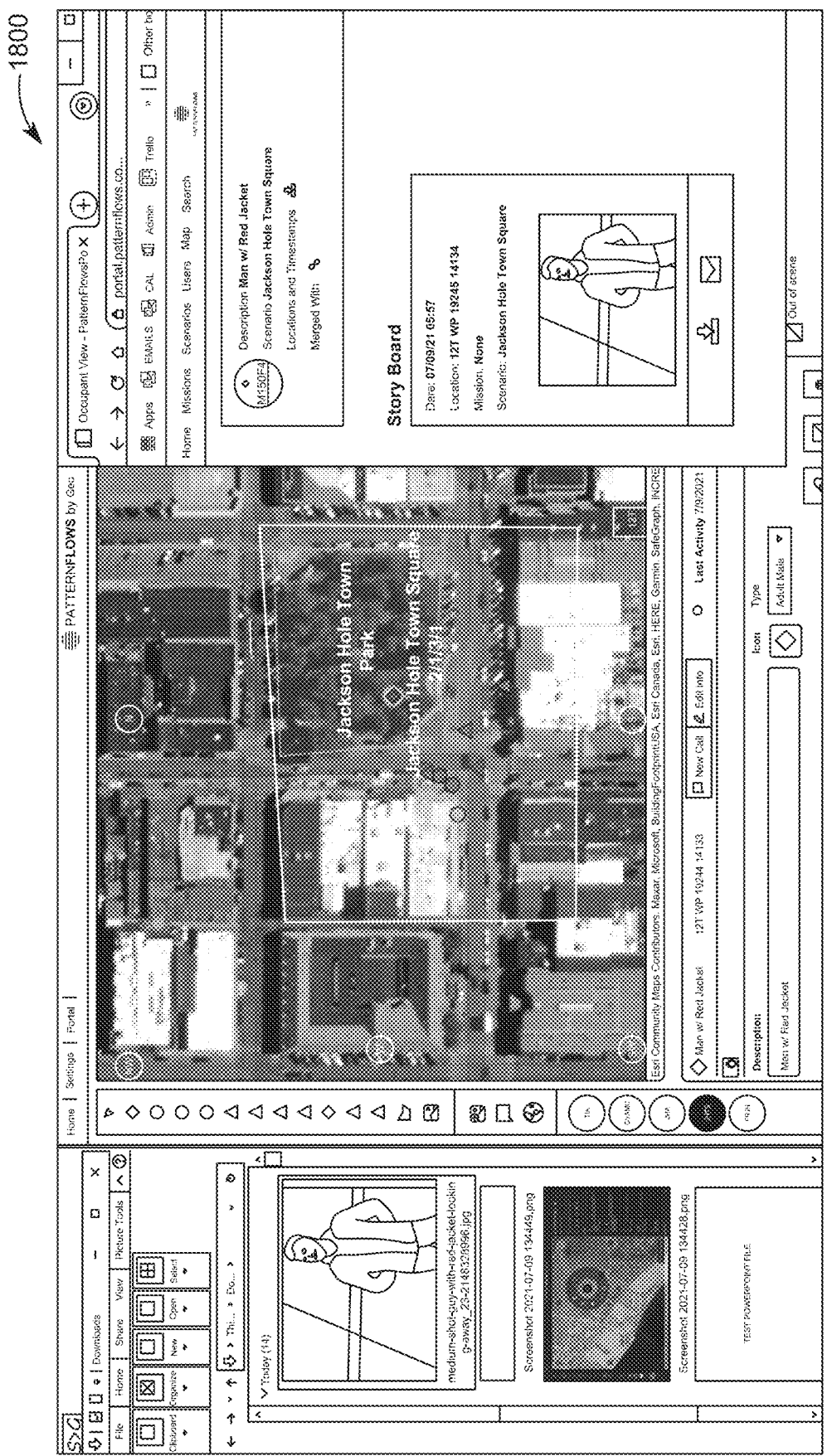
FIG. 18 depicts a GUI illustrating additional ISR data provided by the analyst for the person of interest of FIG. 17 in accordance with embodiments of the present disclosure.

FIG. 18 depicts a GUI 1800 illustrating additional ISR data provided by the analyst for the person of interest of FIG. 17 in accordance with embodiments of the present disclosure. The GUI 1800 also provides for additional entry of data and monitoring by the analyst regarding the person of interest. Data associated with the person of interest is also presented via a storyboard.

Figure 19:
FIG. 19 depicts a GUI illustrating ISR data associated with another person of interest in accordance with embodiments of the present disclosure.

FIG. 19 depicts a GUI 1900 illustrating ISR data associated with another person of interest (i.e. man with blue long sleeve shirt) in accordance with embodiments of the present disclosure. A storyboard for the person of interest is presented in addition to icons to select associated persons of interest at the bottom of the GUI 1900.

Figure 20:
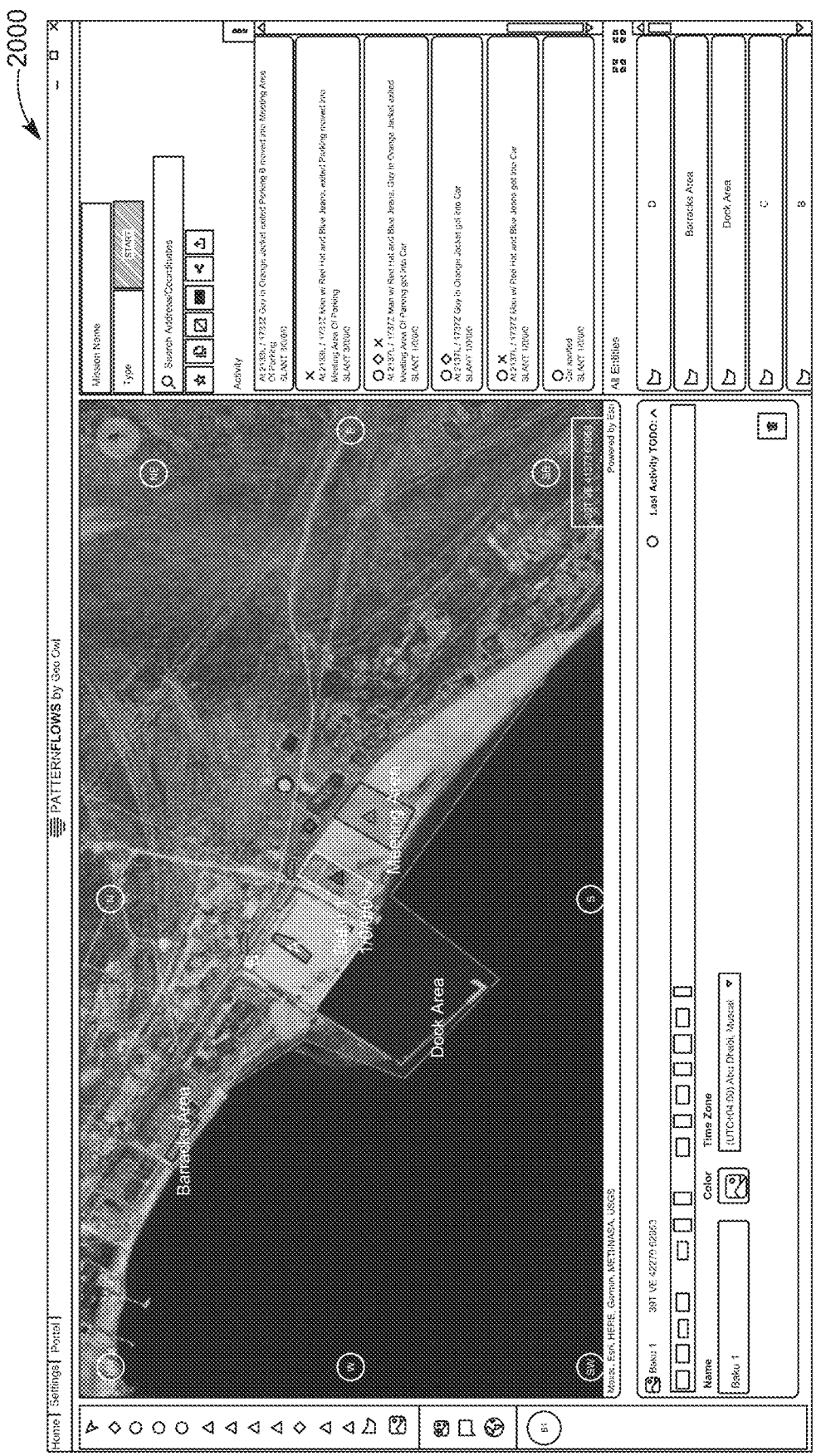
FIG. 20 depicts a GUI illustrating aggregation of ISR data from multiple analysts of an area of interest using georeferenced map data and an associated geometric shape in accordance with embodiments of the present disclosure.

FIG. 20 depicts a GUI 2000 illustrating aggregation of ISR data from multiple analysts of an area of interest using georeferenced map data and an associated geometric shape in accordance with embodiments of the present disclosure. Multiple persons of interest are indicated on a map with geometric shaped defining areas of interest (i.e. dock area, meeting area, barrack area, etc.) Activity data for the multiple persons of interest is presented on the right side of the GUI 2000.

Figure 21:
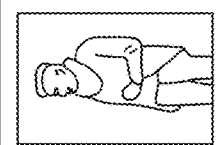
FIG. 21 depicts a GUI illustrating a location and time table of a person of interest of FIG. 20 in accordance with embodiments of the present disclosure.

FIG. 21 depicts a GUI 2100 illustrating a location and time table of a person of interest (i.e. Guy in Orange Jacket) of FIG. 20 in accordance with embodiments of the present disclosure. A storyboard of the person of interest is also presented. In this example, the person of interest has no associated people identified.

Figure 22:
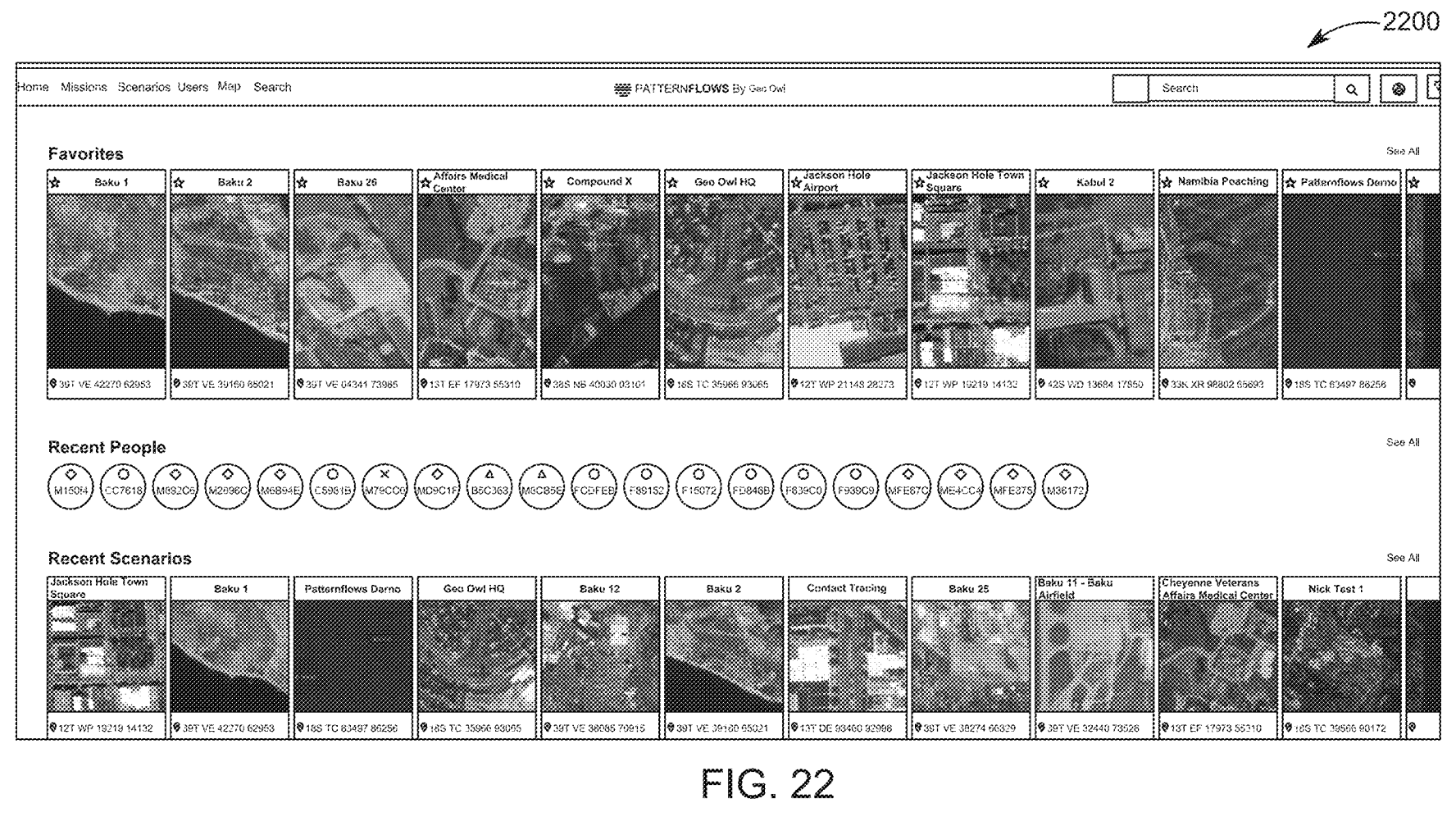

FIG. 22 depicts a GUI 2200 illustrating a plurality of icons for people of interest associated with recent scenarios in accordance with embodiments of the present disclosure. Additionally, icons for favorites and recent scenarios are presented for easy selection by an analyst.

Figure 23A:
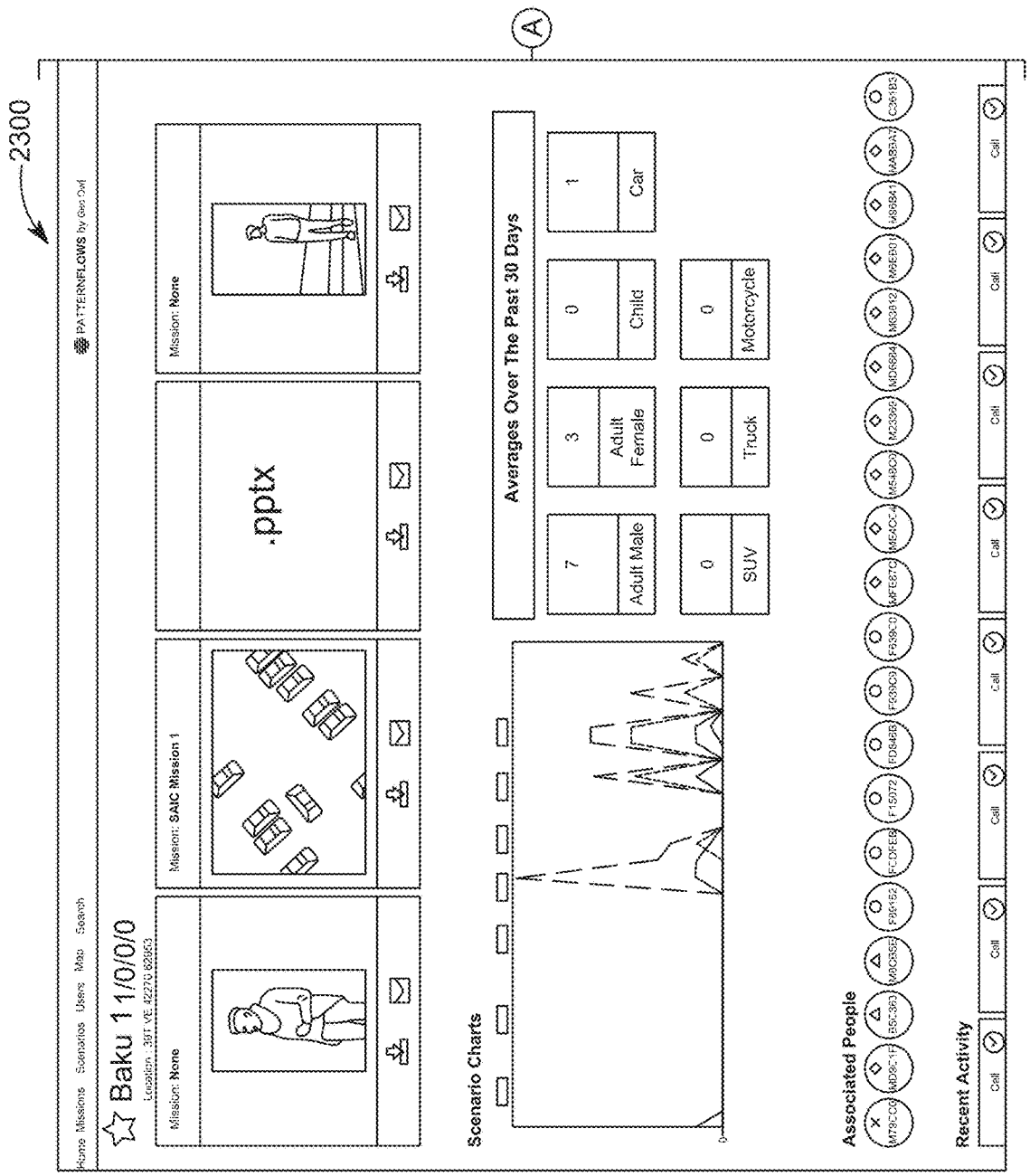
FIG. 23A, FIG. 23B, and FIG. 24 depict GUIs illustrating aggregated ISR data associated with a scenario in accordance with embodiments of the present disclosure.
Figure 23B:
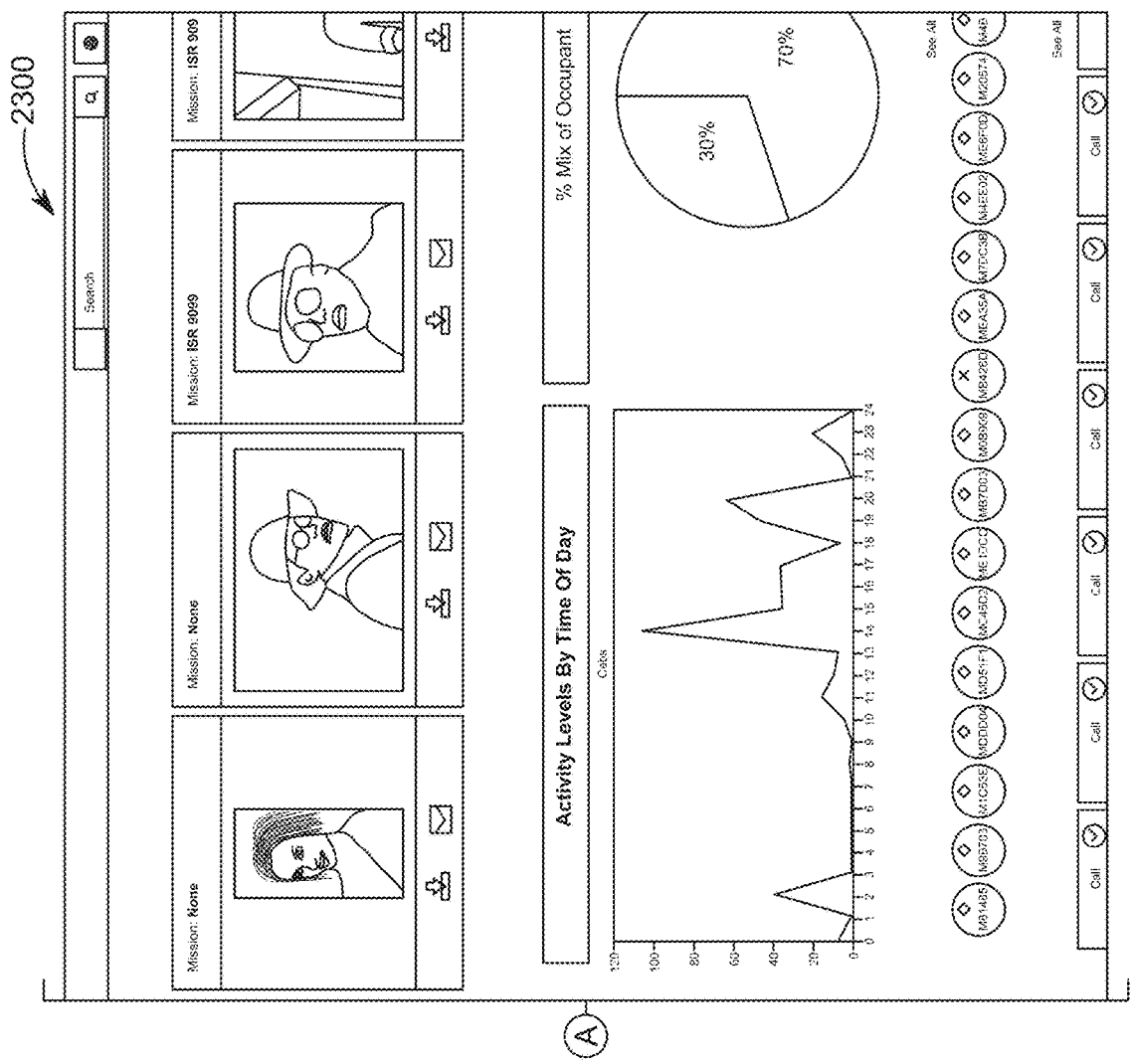

FIG. 23A and FIG. 23B depict a GUI 2300 illustrating aggregated ISR data associated with a scenario (i.e. Baku 1) in accordance with embodiments of the present disclosure. Persons of interest and vehicles of interest are depicted for easy selection. Icons for associated people are also depicted. Scenario charts of the persons of interest and vehicles of interest are present as amount of activity over a time period (i.e. thirty days).

Figure 24:
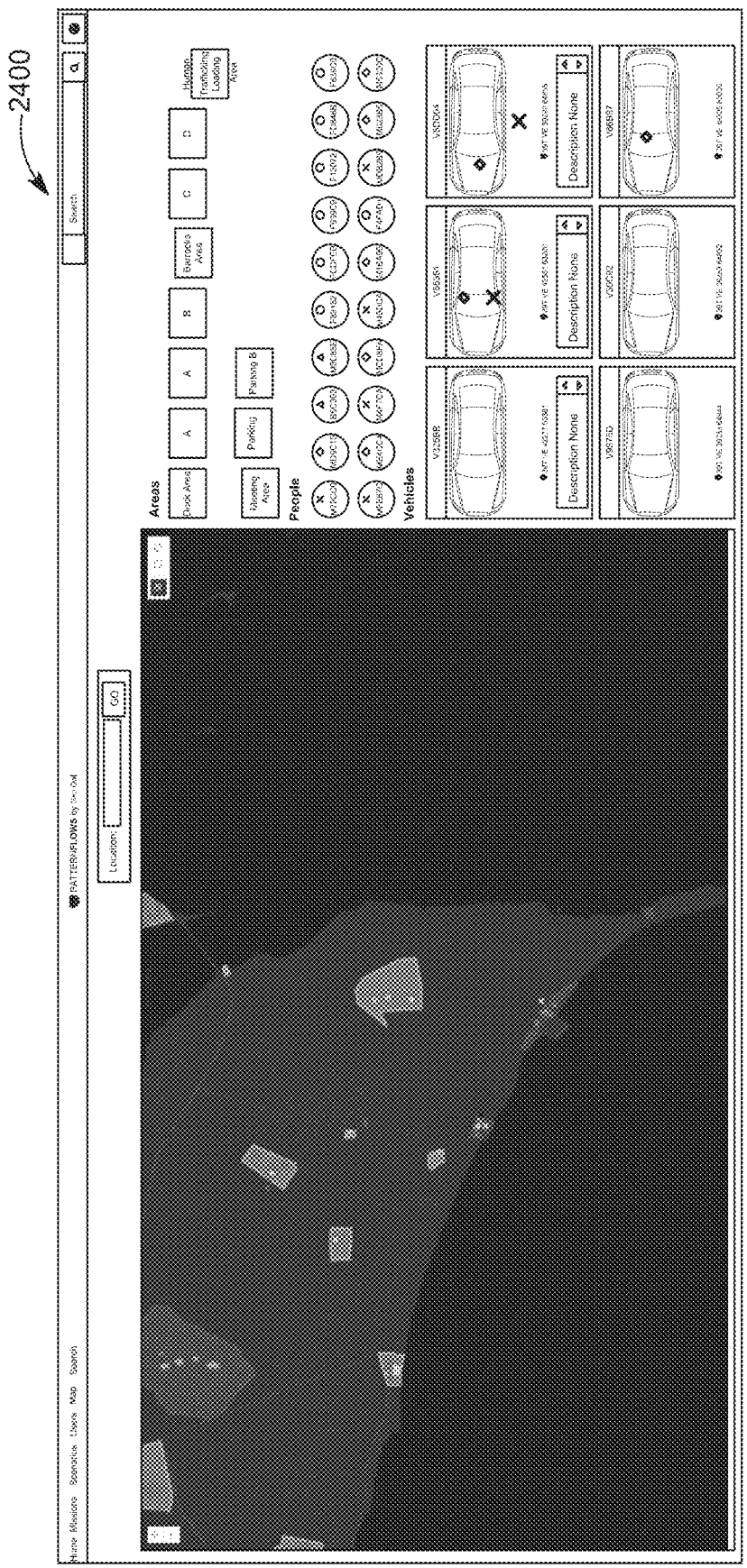

FIG. 24 depicts a GUI 2400 (which is a continuation of the GUI 2300) illustrating additional aggregation of ISR data from multiple analysts of the scenario including an area of interest using georeferenced map data, associated geometric shapes, people of interest, and vehicles of interest in accordance with embodiments of the present disclosure. Icons (including areas, people, and vehicles) associated with the scenario are presented on the right side of GUI 2400 for easy selection by the viewing analyst.

Figure 25A:
FIG. 25A and FIG. 25B depict a GUI illustrating icons for people of interest, vehicles of interest, scenarios, and recent activity associated with a mission in accordance with embodiments of the present disclosure.
Figure 25B:
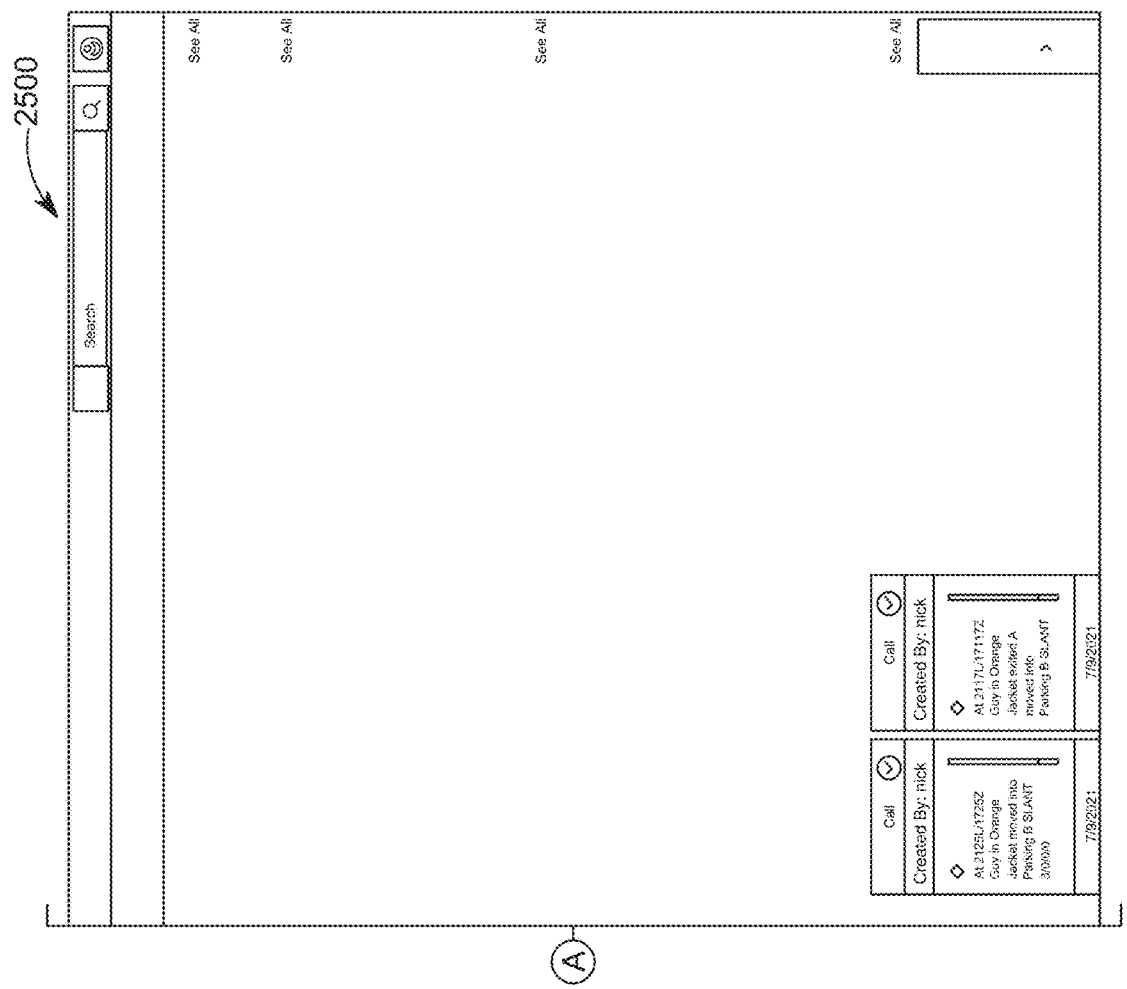

FIG. 25A and FIG. 25B depict a GUI 2500 illustrating icons for people of interest, vehicles of interest, scenarios, and recent activity associated with a mission (i.e. NK Patent Mission 1) in accordance with embodiments of the present disclosure.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product (e.g. Geo Owl server application 202 of FIG. 2) embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including object oriented and/or procedural programming languages. Programming languages may include, but are not limited to: Ruby, JavaScript, Java, Python, Ruby, PHP, C, C++, C#, Objective-C, Go, Scala, Swift, Kotlin, OCaml, or the like. The program code may execute entirely on the user's computer, partly on the user's computer, as a stand-alone software package, partly on the user's computer, and partly on a remote computer or entirely on the remote computer or server.

Aspects of the present invention are described in the instant specification with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. Thus, for example, reference to "a user" can include a plurality of such users, and so forth. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method implemented on at least one server for facilitating one or more users in determining and logging intelligence, surveillance, and reconnaissance (ISR) information, the method comprising:
   receiving georeferenced map data;
   receiving image data;
   transmitting the georeferenced map data and image data to a client device;
   receiving ISR data from the client device; and
   storing the ISR data, wherein:
      the ISR data comprises map call-out data including georeferenced data and slant count formatted data;
      at least a portion of the map call-out data is entered from a graphical user interface (GUI) on the client device;
      the georeferenced data is associated with a geometrical shape and the geometrical shape is entered from a wheel based menu on the GUI;
      the geometrical shape is represented in the map call-out data as a series of geographic coordinates;

the slant count formatted data comprises a first numerical indication of one or more persons of interest, and a second numerical indication of one or more vehicles of interest; and the GUI is configured to display the slant count formatted data.

2. The method of claim 1 further comprising transmitting the ISR data to a tactical operations center.

3. The method of claim 1, wherein the image data is received from at least one of a remotely piloted aircraft (RPA), a satellite based imaging system, and a light detection and ranging (LIDAR) imaging system.

4. The method of claim 1, wherein the image data is associated with a military operations area and the georeferenced map data is associated with the military operations area.

5. The method of claim 1, wherein the geometrical shape is at least one of an oval and a polygon.

6. The method of claim 1, wherein the GUI provides a circular menu having a plurality of templates supporting data entry, and the plurality of templates include a plurality of geometric shape templates.

7. The method of claim 1, wherein the plurality of templates includes at least one vehicle template and at least one person of interest template.

8. The method of claim 1, wherein the georeferenced map data is provided by one or more Esri servers.

9. The method of claim 1, wherein the georeferenced map data is at least one of geographic information systems (GIS) data and geospatial data.

10. The method of claim 1, wherein the georeferenced map data is at least one of raster data and vector data.

11. The method of claim 1, wherein the georeferenced map data comprises a plurality of longitude and latitude coordinates, and elevation data.

12. The method of claim 1, wherein the georeferenced map data is provided by at least one of ArcGIS, Natural Earth, Global Map, United States Geological Survey (USGS) Earth Explorer, Google Maps, OpenStreetMap, OpenTopgraphy, NASA Earth Observations (NEO), Sentinel Satellite Data, and International Steering Committee for Global Mapping (ISCGM) website.

13. The method of claim 1, wherein the client device is a Department of Defense (DoD) compliant device.

14. The method of claim 1, wherein the client device is at least one of a personal computer (PC), a workstation, a laptop, and a smart tablet.

15. The method of claim 1, wherein the at least one server is a portion of a networked computing environment.

16. The method of claim 15, wherein the networked computing environment is a Department of Defense (DoD) compliant networked computing environment.

17. A server comprising
a memory;
a database; and
a processor configured a method of facilitating one or more users in determining and logging intelligence, surveillance, and reconnaissance (ISR) information, the method comprising:
receiving georeferenced map data;
receiving image data;
transmitting the georeferenced map data and image data to a client device;
receiving ISR data from the client device; and
storing the ISR data, wherein:
the ISR data comprises map call-out data including georeferenced data and slant count formatted data;
at least a portion of the map call-out data is entered from a graphical user interface (GUI) on the client device;
the georeferenced data is associated with a geometrical shape and the geometrical shape is entered from a wheel based menu on the GUI;
the geometrical shape is represented in the map call-out data as a series of geographic coordinates;
the slant count formatted data comprises a first numerical indication of one or more persons of interest, and a second numerical indication of one or more vehicles of interest; and
the GUI is configured to display the slant count formatted data.

18. A non-transitory computer readable medium comprising a plurality of machine-readable instructions which when executed by one or more processors of a server are adapted to cause the server to perform a method of facilitating one or more users in determining and logging intelligence, surveillance, and reconnaissance (ISR) information, the method comprising:
receiving georeferenced map data;
receiving image data;
transmitting the georeferenced map data and image data to a client device;
receiving ISR data from the client device; and
storing the ISR data, wherein:
the ISR data comprises map call-out data including georeferenced data and slant count formatted data;
at least a portion of the map call-out data is entered from a graphical user interface (GUI) on the client device;
the georeferenced data is associated with a geometrical shape and the geometrical shape is entered from a wheel based menu on the GUI;
the geometrical shape is represented in the map call-out data as a series of geographic coordinates;
the slant count formatted data comprises a first numerical indication of one or more persons of interest, and a second numerical indication of one or more vehicles of interest; and
the GUI is configured to display the slant count formatted data.

* * * * *